United States Patent
Day

(10) Patent No.: US 10,110,814 B1
(45) Date of Patent: Oct. 23, 2018

(54) REDUCING BANDWIDTH FOR VIDEO STREAMING USING DE-WARPING AND VIDEO ANALYTICS

(71) Applicant: Ambarella, Inc., Santa Clara, CA (US)

(72) Inventor: Christopher N. Day, Los Gatos, CA (US)

(73) Assignee: Ambarella, Inc., Santa Clara, CA (US)

( * ) Notice: Subject to any disclaimer, the term of this patent is extended or adjusted under 35 U.S.C. 154(b) by 183 days.

(21) Appl. No.: 15/335,872

(22) Filed: Oct. 27, 2016

(51) Int. Cl.
*H04N 7/00* (2011.01)
*H04N 5/232* (2006.01)
*H04N 5/262* (2006.01)
*G06K 9/00* (2006.01)
*G06T 3/00* (2006.01)

(52) U.S. Cl.
CPC ..... *H04N 5/23238* (2013.01); *G06K 9/00711* (2013.01); *G06T 3/0018* (2013.01); *G06T 3/0062* (2013.01); *H04N 5/2628* (2013.01); *G06T 2207/10016* (2013.01); *G06T 2207/10032* (2013.01); *G06T 2207/30228* (2013.01)

(58) Field of Classification Search
CPC .............. H04N 5/23238; H04N 5/2628; G06T 3/0062; G06T 3/0018; G06T 2207/10016; G06T 2207/10032; G06T 2207/30228

USPC .......................................................... 348/38
See application file for complete search history.

(56) References Cited

U.S. PATENT DOCUMENTS

| | | | |
|---|---|---|---|
| 2015/0312498 A1* | 10/2015 | Kawano | H04N 5/3572 348/222.1 |
| 2016/0050349 A1* | 2/2016 | Vance | H04N 5/2259 348/36 |
| 2017/0347084 A1* | 11/2017 | Boyce | H04N 13/0014 |

\* cited by examiner

*Primary Examiner* — Allen Wong
(74) *Attorney, Agent, or Firm* — Christopher P. Maiorana, PC

(57) ABSTRACT

An apparatus comprising an interface and a processor. The interface may be configured to receive a panoramic video stream from a capture device and present one or more enhanced region of interest video frames to a communication device. The processor may be configured to perform de-warping operations on the panoramic video stream received from the interface, perform video analytics on the de-warped panoramic video stream to select a region of interest, crop the de-warped panoramic video based on the region of interest to generate a region of interest video frame, enhance the region of interest video frame and present the enhanced region of interest video frame to the interface. The de-warping operations may be implemented to correct distortion caused by the capture device. The region of interest may be dynamically selected based on objects detected in response to the video analytics.

15 Claims, 10 Drawing Sheets

US 10,110,814 B1

REDUCING BANDWIDTH FOR VIDEO STREAMING USING DE-WARPING AND VIDEO ANALYTICS

FIELD OF THE INVENTION

The invention relates to video capture generally and, more particularly, to a method and/or apparatus for reducing bandwidth for video streaming from a drone using de-warping and video analytics.

BACKGROUND

A wide angle camera can capture a wide field of view without physically moving or rotating the camera. A wide angle camera can capture a panoramic video (i.e., a 360-degree video). Unmanned aerial vehicles (i.e., drones) can be equipped with a wide angle camera. The drone can wirelessly stream video captured using the wide angle camera.

High resolution images and video can result in large data files. Panoramic video frames with good visual quality are large high resolution images. Communicating panoramic video uses a high data rate. The high data rate for communicating panoramic video can be problematic for live video streaming over bandwidth-constrained wireless connections.

It would be desirable to implement reducing bandwidth for video streaming using de-warping and video analytics.

SUMMARY

The invention concerns an apparatus comprising an interface and a processor. The interface may be configured to receive a panoramic video stream from a capture device and present one or more enhanced region of interest video frames to a communication device. The processor may be configured to perform de-warping operations on the panoramic video stream received from the interface, perform video analytics on the de-warped panoramic video stream to select a region of interest, crop the de-warped panoramic video based on the region of interest to generate a region of interest video frame, enhance the region of interest video frame and present the enhanced region of interest video frame to the interface. The de-warping operations may be implemented to correct distortion caused by the capture device. The region of interest may be dynamically selected based on objects detected in response to the video analytics.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing video streaming that may (i) reduce bandwidth, (ii) implement a hardware de-warping engine, (iii) perform intelligent video analytics, (iv) crop a region of interest from a panoramic video, (v) capture video using a wide angle lens, (vi) detect objects in a panoramic video, (vii) dynamically adjust the region of interest based on movements of objects over video frames, (viii) implement over-sampling to generate higher resolution images within size constraints, (ix) be implemented from a drone and/or (x) be implemented as one or more integrated circuits.

Figure 1:
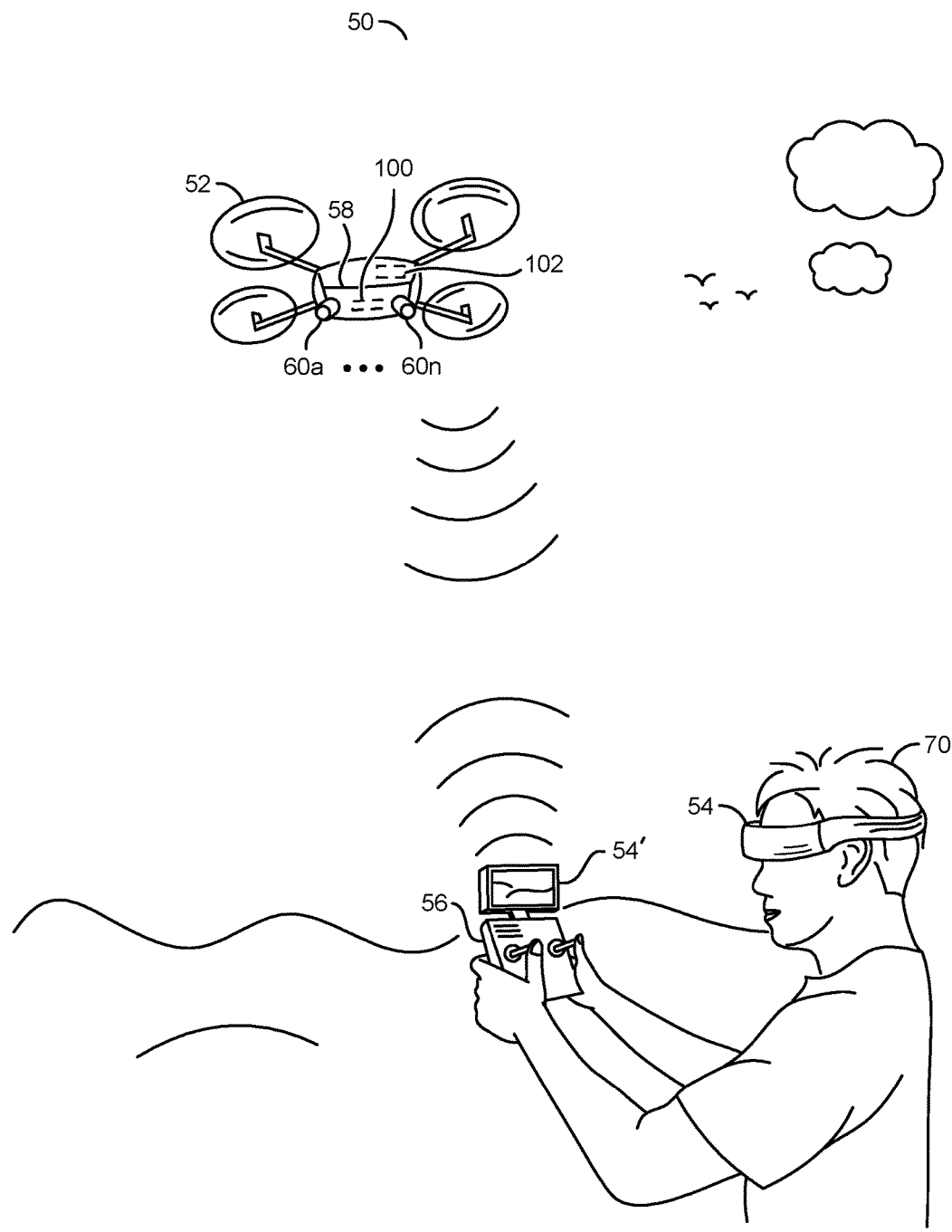
FIG. 1 is a diagram illustrating an embodiment of the invention.

Referring to FIG. 1, a diagram illustrating an embodiment of the invention is shown. A system 50 is shown. The system 50 may comprise an unmanned aerial vehicle (or drone) 52, a playback (or viewing) device 54, a remote controller 56, a camera 58, lenses 60a-60n, a pilot 70, an apparatus 100 and/or a block (or circuit) 102. The system 50 may be implemented to control the drone 52 and/or receive video from the perspective of the drone 52.

The apparatus 100 may be implemented to generate video data. The video data may be a panoramic video. The video data may be communicated over a network. For example, the network may be a bandwidth-constrained network (e.g., a wireless network). The apparatus 100 may combine hardware de-warping, intelligent video analytics and/or digital zooming. The apparatus 100 may reduce wireless bandwidth consumption when communicating video data. The apparatus 100 may increase image resolution within the available bandwidth. The apparatus 100 may implement a hardware de-warping engine combined with video analytics to reduce bandwidth consumption for live wireless video streaming from a wide angle camera design in drones.

Generally, the panoramic video may comprise a large field of view generated by one or more lenses/camera sensors. One example of a panoramic video may be an equirectangular 360 video. Equirectangular 360 video may also be called spherical panoramas. Panoramic video may be a video that provides a field of view that is larger than the field of view that may be displayed on a device used to playback the video (e.g., the playback device 54). In some embodiments, portions of the panoramic video may be cropped to the size of the display of the playback device 54 (e.g., portions of the panoramic video outside of the cropped portion may be discarded and/or not displayed). In some embodiments, the panoramic video may be panned in one or more directions to see additional portions of the panoramic video outside of the field of view of the playback device 54. For example, the panoramic video may comprise a spherical video, a hemispherical video, a 360 degree video, a wide angle video, a video having less than a 360 field of view, etc.

Panoramic videos may comprise a view of the environment near the camera 58. In one example, the entire field of view of the panoramic video may be captured at generally the same time (e.g., each portion of the panoramic video represents the view from the camera 58 at one particular moment in time). In some embodiments (e.g., when the camera 58 implements a rolling shutter sensor), a small amount of time difference may be present between some portions of the panoramic video. Generally, each video frame of the panoramic video comprises one exposure of the sensor (or multiple sensors) capturing the environment near the camera 58.

In some embodiments, the panoramic video may provide coverage for a full 360 degree field of view. In some embodiments, less than a 360 degree view may be captured by the panoramic video (e.g., a 270 degree field of view, a 180 degree field of view, etc.). In some embodiments, the panoramic video may comprise a spherical field of view (e.g., capture video above and below the camera 58). In some embodiments, the panoramic video may comprise a field of view that is less than a spherical field of view (e.g., the camera 58 may be configured to capture the ground below and the areas to the sides of the camera 58 but nothing directly above). The implementation of the panoramic video may be varied according to the design criteria of a particular implementation.

In some embodiments, the system 50 may be implemented for first-person view (FPV) racing of the drone 52 and/or aerial surveying. For example, aerial surveying may be used to implement security surveillance from above. In another example, aerial surveying may be used for broadcast purposes (news reporting, sporting events, concert events, etc.). The playback device 54 may receive the video stream live from the drone 52. The pilot 70 may view the video stream using the playback device 54 to see a live view from the perspective of the drone 52. The pilot 70 may react to the environment by viewing the video captured by the apparatus 100 and provide control to the drone 52 using the remote controller 56. In a racing embodiment, the pilot 70 may need to react quickly to traverse a set course as fast as possible and/or prevent the drone 52 from crashing and/or traveling out of the bounds of the course.

In one example, the bandwidth-constrained network may be a peer-to-peer (P2P) network (e.g., a direct connection between nodes without connecting to a central server). In another example, the bandwidth-constrained network may be a connection to a central server. The bandwidth-constrained network may be implemented as a wireless connection. In the example shown, a wireless network is shown communicating between the drone 52, the remote controller 56 and/or the playback device 54. In one example, the network may be implemented using a wired connection. In another example, the network may be implemented using a wireless connection (e.g., Wi-Fi, Bluetooth, ZigBee, radio frequency, etc.).

The drone 52 may be capable of hovering and/or moving in a variety of directions. For example, the drone 52 may accelerate and/or change direction quickly. The drone 52 may comprise the camera 58, the lenses 60a-60n, the apparatus 100, the communication device 102 and/or other components (not shown). In some embodiments, the communication device 102 and/or the lenses 60a-60n may be a component of the apparatus 100.

The playback device 54 may be implemented as a display, a wearable headset, or other video viewing device. The display 54 may be worn (or viewed) by the user (e.g., the pilot 70 and/or other viewers). The display 54 may be configured to display video frames (e.g., video frames, panoramic video frames, portions of panoramic video frames, etc.) of the panoramic video. The display 54 may present a portion of each of the panoramic video frames generated by the apparatus 100. The portion of each of the panoramic video frames that is displayed may be a region of interest. The region of interest may represent a portion of the panoramic video selected by the apparatus 100. For example, the display 54 may receive the region of interest portion of the panoramic video from the apparatus 100 and/or the communication device 102.

The playback device 54' is shown as a screen that is part of the remote controller 56. In some embodiments, the pilot 70 may not wear the headset 54. In one example, the playback device 54' may be implemented as a touchscreen device. In some embodiments, the playback device 54' may be implemented as a smartphone and/or a tablet computing device. A display of the smartphone and/or tablet computing device may display the current region of interest to the pilot 70.

In some embodiments, the playback device 54' may be a desktop computer, laptop computer, notebook computer, etc. A computer monitor may be used to view the current region of interest. Computer input peripherals may be used by the pilot 70 provide control input to the drone 52. In an example, a mouse cursor, keyboard controls, a joystick, and/or a software interface may be implemented for the computer to control a flight path of the drone 52. The implementation of the playback device 54' may be varied according to the design criteria of a particular implementation.

The playback device 54 may be configured to receive the video stream from the drone 52. The video stream may be a live (or near-live) video feed of the panoramic video stream. The video stream may provide the pilot 70 with a view from the perspective of the drone 52. When the viewing device 54 is implemented as a headset, the video stream may provide a first-person view (FPV) of the drone 52. The playback device 54 may display the region of interest to the pilot 70.

The pilot 70 is shown holding the remote controller 56. In some embodiments, the playback device 54' may be implemented as a screen and/or handheld device (e.g., a screen that is part of the remote controller 56). The remote controller 56 may be configured to send control data to the drone 52 (e.g., provide flight control). For example, the remote controller 56 may implement a radio frequency (RF) transmission to control the drone 52. The pilot 70 may provide input to the remote controller 56 to direct the movement of the drone 52.

The camera 58 may be implemented as a panoramic field of view camera (e.g., a camera configured to record panoramic video, spherical video, a 360 degree video and/or less than a 360 degree video, etc.). In one example, the panoramic field of view may allow an end user to view a video of the environment surrounding the camera 58 (e.g., a live stream). In another example, the panoramic field of view may allow the end user to view a previously recorded video of the environment surrounding the camera 58. The playback device 54 may be configured to display the panoramic field of view to the end user.

In some embodiments, the camera 58 may be implemented having one wide angle (or fisheye) lens. In some embodiments, the camera 58 may be implemented as a multi-sensor camera. For example, the camera 58 may be implemented having more than one wide angle lens. The camera 58 is shown comprising the lenses 60a-60n. In one example, the camera 58 may comprise two of the lenses 60a-60n. In another example, the camera 58 may comprise four of the lenses 60a-60n. The implementation of the camera 58 may be varied according to the design criteria of a particular implementation.

Figure 2:
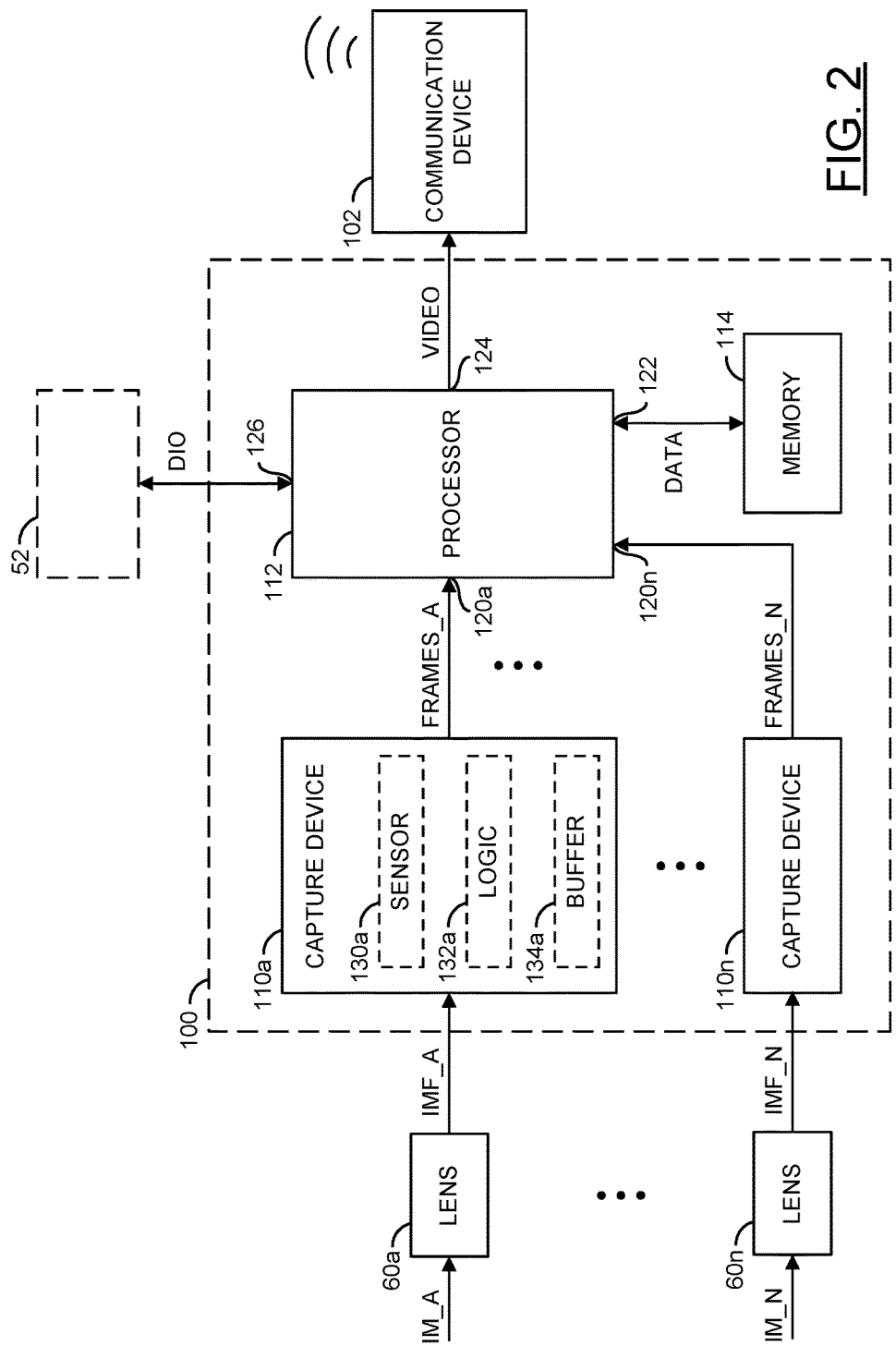
FIG. 2 is a block diagram illustrating an example embodiment of a system on chip for generating a panoramic video.

The camera 58 generally comprises a number of capture devices (to be described in more detail in association with FIG. 2). Each of the capture devices may be implemented as a sensor, a standalone camera, or other video capture device. Each of the capture devices may comprise one of the lenses 60a-60n. In embodiments implementing many of the lenses 60a-60n, each of the lenses 60a-60n may point in a different direction. By having each of the lenses 60a-60n capture a different direction, the camera 58 may capture a panoramic view of the environment surrounding the drone 52. In the embodiment shown, the lenses 60a-60n may surround the camera 58. However, the lenses 60a-60n may be configured to capture fields of view above and/or below a level of the camera 58. In embodiments implementing multiple lenses, each of the lenses 60a-60n may be directed towards one particular direction to provide coverage for a full 360 degree field of view. In embodiments implementing a single wide angle lens (e.g., the lens 60a), the lens 60a may be located to provide coverage for the full 360 degree field of view (e.g., on the bottom of the drone 52). In some embodiments, less than a 360 degree view may be captured by the lenses 60a-60n (e.g., a 270 degree field of view, a 180 degree field of view, etc.). In some embodiments, the lenses 60a-60n may move (e.g., the direction of the capture devices may be controllable). In some embodiments, one or more of the lenses 60a-60n may be configured to implement an optical zoom (e.g., the lenses 60a-60n may zoom in/out independent of each other). In some embodiments, digital panning and/or zooming performed on the panoramic video by the apparatus 100 may be used instead of and/or in addition to mechanically moving and/or zooming the lenses 60a-60n.

In some embodiments, the lenses 60a-60n may be configured to capture a panoramic video that comprises a spherical field of view (e.g., capture video above and below the drone 52). In some embodiments, the lenses 60a-60n may be configured to capture a panoramic field of view that is less than a spherical field of view (e.g., the lenses 60a-60n may be configured to capture the ground below and the areas to the sides of the drone 52). In some embodiments, each of the lenses 60a-60n may be used by the camera 52 to capture video frames that provide a portion of a field of view that may be stitched together by the apparatus 100 to provide a field of view that is wider than the field of view captured by each individual one of the lenses 60a-60n. In some embodiments, the lens 60a may be implemented as part of a single capture device configured to capture a wide angle (e.g., the apparatus 100 may be configured to de-warp the captured video). The implementation and/or arrangement of the lenses 60a-60n may be varied according to the design criteria of a particular implementation.

In some embodiments, the camera 58 may comprise the apparatus 100. In some embodiments, the apparatus 100 may be a component of the drone 52. The apparatus 100 may be a processor and/or a system on chip (SoC). For example, the apparatus 100 may be implemented as a printed circuit board comprising one or more components. The apparatus 100 may be configured to encode video frames captured by each of the capture devices of the camera 52. In some embodiments, the apparatus 100 may be configured to perform video stitching operations to stitch video frames captured by each of the lenses 60a-60n to generate the panoramic field of view (e.g., the panoramic video frames). In some embodiments, the apparatus 100 may generate the panoramic video from one wide angle lens.

The apparatus 100 may be configured to capture images and/or video of the environment near the drone 52. For example, the apparatus 100 may capture the environment in the directions of the capture devices 60a-60n. The apparatus 100 may be configured to generate video signals based on the captured images from the camera 58. In some embodiments, the apparatus 100 may be configured to perform video stitching operations and/or de-warping operations on the video streams received from the camera 58 to generate the panoramic video stream. In some embodiments, the apparatus 100 may be configured to perform de-warping operations on the video stream captured by the wide angle lens 60a. The apparatus 100 may format (or encode) the video signals to be transmitted wirelessly and/or stored locally. The apparatus 100 may be configured to perform intelligent video analysis on the video frames of the de-warped, panoramic video. The apparatus 100 may be configured to crop and/or enhance the panoramic video.

The wireless communication device 102 may be configured to transmit the cropped and/or enhanced video signal to the playback device 54. The wireless communication device 102 may be configured to receive flight control signals from the remote controller 56. For example, the drone 52 may comprise the wireless transmission module 102, and the apparatus 100 may provide the video signal (e.g., the enhanced and/or cropped panoramic video stream) to the wireless transmission module 102. The drone 52 is shown transmitting data wirelessly. For example, the drone 52 may wirelessly transmit a video stream generated by the apparatus 100.

Different communication channels may be implemented to transmit video (e.g., the panoramic video and/or portions of the panoramic video) and drone control. In an example, the communication device 102 may implement one channel to transmit video and a different remote-control (RC) channel for drone control (e.g., input from the pilot 70 using the remote control 56). Example frequencies may comprise 900 MHz, 1.2 GHz, 2.4 GHz and/or 5.8 GHz. In an example, if the drone 52 implements a RC transmitter on one of the frequencies for control, then, in order to avoid interference, another one of the frequencies could be selected for the transmitting the panoramic video signal. For example, many video transmitters operate at 5.8 GHz. Other frequencies may be implemented. The channels used for a particular type of communication (e.g., video or control) and/or the frequencies used may be varied according to the design criteria of a particular implementation.

In some embodiments, the remote controller 56 and/or flight control signals from the pilot 70 may be optional. For example, the drone 52 may implement an autonomous drone. In embodiments where the drone 52 is autonomous, the drone 52 may travel a pre-determined path and/or make decisions about where to travel without input from the pilot 70. In some embodiments, data generated in response to the intelligent video analysis performed by the apparatus 100 may be used by the drone 52 to make decisions to determine the flight path. In embodiments where the drone 52 is autonomous, the communication device 102 may still transmit the panoramic video signal to the playback device 54.

To provide a useful view to the pilot 70, the video stream may be generated by the apparatus 100 with low and/or negligible delay. The pilot 70 may be unable to react appropriately if there is lag (e.g., a delay) between what is viewed on the playback device 54 and where the drone 52 is actually located. The apparatus 100 may be configured to generate a viewable portion of the panoramic video that may be transmitted using a lower bitrate that still provides a high quality visual representation of objects detected by the apparatus 100. Without the apparatus 100, the quality of the video that the pilot 70 sees when using the playback device 54 may be low-quality and/or laggy. For example, low-quality and/or laggy video may be distracting and/or reduce a feeling of immersiveness. In another example, low-quality and/or laggy video may cause nausea for the pilot 70. The apparatus 100 may be configured to provide a low-latency video stream from the drone 52 to the playback device 54 without sacrificing video quality in the selected region of interest. The apparatus 100 may be configured to generate a high resolution image within the total size constraints of the cropped region of the panoramic video.

The drone 52 may be configured to fly and travel in many directions and/or have an extended range of flight. Generally, a wired connection between the drone 52 and the playback device 54 may not be practical. Similarly, a wired connection between the drone 52 and a central server and/or a computing device may be impractical. To communicate with the playback device 54, the drone may implement a wireless connection using the wireless communication device 102. The wireless connection may have a limited bandwidth for transmitting data. Panoramic videos may comprise a large amount of data. Without the apparatus 100 to encode the panoramic video to reduce a bitrate of the panoramic video, the wireless connection between the drone 52 and the playback device 54 may not be possible without introducing lags and/or delay.

The apparatus 100 may be configured to reduce a bitrate of portions of the panoramic video while providing a high quality video to a viewer. The apparatus 100 may be implemented to enable a wireless transmission of the cropped portion of the panoramic video signal that may be played back smoothly using the playback device 54 (e.g., limited delay and/or buffering of the panoramic video).

The system 50 may be a peer-to-peer implementation. The drone 52 (using the wireless communication device 102) may form a peer-to-peer connection with the playback device 54. In an example, the panoramic video may be generated by components of the drone 52 (e.g., the apparatus 100), cropped and/or enhanced on the drone 52 and transmitted directly from the drone 52 to the playback device 54. To implement the peer-to-peer connection, the apparatus 100 may be configured to generate the panoramic video from the video streams captured by the camera 58 on-board the drone 52. For example, the apparatus 100 may be configured to perform video stitching operations to stitch together the various fields of view captured by each of the lenses 60a-60n and/or de-warp frames captured by wide angle lenses to generate panoramic (or spherical or 360 degree) video frames.

To implement the communication of the selected region of interest of the panoramic video, the apparatus 100 may be configured to perform intelligent video analytics on the panoramic video frames. The apparatus 100 may be configured to select the region of interest and/or dynamically adjust the region of interest for one or more upcoming frames of the panoramic video stream corresponding to objects detected and/or recognized in the video frames. The apparatus 100 may encode and/or enhance the region of interest (e.g., to provide a high quality video).

Referring to FIG. 2, a block diagram illustrating an example embodiment of a system on chip for generating a panoramic video is shown. The apparatus 100 generally comprises blocks (or circuits) 110a-110n, a block (or circuit) 112 and/or a block (or circuit) 114. The circuits 110a-110n may be implemented as capture devices. The circuit 112 may be implemented as a processor. In an example implementation, the circuit 112 may be implemented as a video processor. The processor 112 may comprise inputs 120a-120n, an input 122 and/or other inputs. The processor 112 may comprise an output 124 and/or other outputs. The processor 112 may comprise an input/output 126. The circuit 114 may be implemented as a memory.

In the embodiment shown, the capture devices 110a-110n may be components of the apparatus 100. In some embodiments, the capture devices 110a-110n may be separate devices (e.g., part of the drone 52 and/or part of the camera 58) configured to send data to the apparatus 100. Similarly, in some embodiments the wireless communication device 102 may be a component of the apparatus 100 and in some embodiments the wireless communication device 102 may be a separate device (e.g., part of the drone 52).

The apparatus 100 may receive one or more signals (e.g., IMF_A-IMF_N). The apparatus 100 may present a signal (e.g., VIDEO). The capture devices 110a-110n may receive the signals IMF_A-IMF_N from the corresponding lenses 60a-60n. The apparatus 100 may present the signal VIDEO to the communication device 102. For example, the wireless communication device 102 may be a radio-frequency (RF) transmitter. In another example, the communication device 102 may be a Wi-Fi module. In another example, the communication device 102 may be a device capable of implementing RF transmission, Wi-Fi, Bluetooth and/or other wireless communication protocols.

The lenses 60a-60n may capture signals (e.g., IM_A-IM_N). The signals IM_A-IM_N may be an image (e.g., an analog image) of the environment near the drone 52 that are presented by the lenses 60a-60n to the capture devices 110a-110n as the signals IMF_A-IMF_N. The lenses 60a-60n may be implemented as an optical lens. The lenses 60a-60n may provide a zooming feature and/or a focusing feature. The capture devices 110a-110n and/or the lenses 60a-60n may be implemented, in one example, as a single lens assembly. In another example, the lenses 60a-60n may be a separate implementation from the capture devices 110a-110n. The capture devices 110a-110n are shown within the circuit 100. In an example implementation, the capture devices 110a-110n may be implemented outside of the circuit 100 (e.g., along with the lenses 60a-60n as part of a lens/capture device assembly).

The capture devices 110a-110n may be configured to capture image data for video (e.g., the signals IMF_A-IMF_N from the lenses 60a-60n). In some embodiments, the capture devices 110a-110n may be video capturing devices such as cameras. The capture devices 110a-110n may capture data received through the lenses 60a-60n to generate bitstreams (e.g., generate video frames). For example, the capture devices 110a-110n may receive focused light from the lenses 60a-60n. The lenses 60a-60n may be directed, tilted, panned, zoomed and/or rotated to provide a targeted view from the drone 52 (e.g., to provide coverage for a panoramic field of view). The capture devices 110a-110n may generate signals (e.g., FRAMES_A-FRAMES_N). The signals FRAMES_A-FRAMES N may be video data (e.g., a sequence of video frames). The signals FRAMES_A-FRAMES_N may be presented to the inputs 120a-120n of the processor 112.

The capture devices 110a-110n may transform the received focused light signals IMF_A-IMF_N into digital data (e.g., bitstreams). In some embodiments, the capture devices 110a-110n may perform an analog to digital conversion. For example, the capture devices 110a-110n may perform a photoelectric conversion of the focused light received by the lenses 60a-60n. The capture devices 110a-110n may transform the bitstreams into video data, video files and/or video frames. In some embodiments, the video data generated by the capture devices 110a-110n may be uncompressed and/or raw data generated in response to the focused light from the lenses 60a-60n. In some embodiments, the video data may be digital video signals. The video signals may comprise video frames.

In some embodiments, the video data may be encoded at a high bitrate. For example, the signal may be generated using a lossless compression and/or with a low amount of lossiness. In some embodiments, the video data captured by the capture devices 110a-110n may be presented to the apparatus 100 in the camera 58. The apparatus 100 may encode the video data captured by the capture devices 110a-110n to generate the signal VIDEO.

In some embodiments, the apparatus 100 may further comprise an audio capture device (e.g., a microphone). The audio capture device may capture audio of the environment. The apparatus 100 may be configured to synchronize the audio captured with the images captured by the capture devices 110a-110n.

The processor 112 may receive the signals FRAMES_A-FRAMES_N from the capture devices 110a-110n at the inputs 120a-120n and/or a signal (e.g., DATA) from the memory 114 at the input 122. The processor 112 may send/receive a signal (e.g., DIO). The processor 112 may be connected through a bi-directional interface (or connection) to components of the drone 52, the capture devices 110a-110n, to the communication device 102 and/or to the memory 114. The processor 112 may store and/or retrieve data from the memory 114. The memory 114 may be configured to store computer readable/executable instructions (or firmware). The instructions, when executed by the processor 112 may perform a number of steps.

The processor 112 may be configured to receive the signals FRAMES_A-FRAMES_N, the signal DATA, the signal DIO and/or other inputs. The signal FRAMES_A-FRAMES_N may comprise video data (e.g., one or more video frames) providing a field of view captured by the lenses 60a-60n. The processor 112 may be configured to generate the signal VIDEO and/or other signals (not shown). The signal VIDEO may be generated based on one or more decisions made and/or functions performed by the processor 112. The decisions made and/or functions performed by the processor 112 may be determined based on data received by the processor 112 at the inputs 120a-120n (e.g., the signals FRAMES_A-FRAMES_N), the input 122 and/or other inputs.

The inputs 120a-120n, the input 122, the output 124, the input/output 126 and/or other inputs/outputs may implement an interface. The interface may be implemented to transfer data to/from the processor 112, the communication device 102, the capture devices 110a-110n, the memory 114 and/or other components of the apparatus 100 and/or the drone 52. In one example, the interface may be configured to receive (e.g., via the inputs 120a-120n) the video streams FRAMES_A-FRAMES_N each from a respective one of the capture devices 110a-110n. In yet another example, the interface may be configured to output one or more upcoming video frames of the cropped and/or enhanced panoramic video stream (e.g., the signal VIDEO) to the communication device 102. The interface may be configured to enable transfer of data and/or translate data from one format to another format to ensure that the data transferred is readable by the intended destination component. In an example, the interface may comprise a data bus, traces, connectors, wires and/or pins. The implementation of the interface may be varied according to the design criteria of a particular implementation.

The signal VIDEO may be presented to the communication device 102. The signal VIDEO may be an encoded, cropped, stitched and/or enhanced version of one or more of the signals FRAMES_A-FRAMES_N. The signal VIDEO may be a high resolution, digital, encoded, de-warped, stabilized, cropped, blended, stitched and/or rolling shutter effect corrected version of the signals FRAMES_A-FRAMES_N. In some embodiments, the apparatus 100 may be configured to balance an amount of time needed to generate the signal VIDEO with the visual quality of the signal VIDEO.

The apparatus 100 may implement a camera system. In some embodiments, the camera system 100 may be implemented as a drop-in solution (e.g., installed as one component). In an example, the camera system 100 may be a device that may be installed as an after-market product for the drone 52 (e.g., a retro-fit for the drone 52). In some embodiments, the apparatus 100 may be a component of the camera 58. The number and/or types of signals and/or components implemented by the camera system 100 may be varied according to the design criteria of a particular implementation.

The video data of the targeted view from the drone 52 may be represented as the signals/bitstreams/data FRAMES_A-FRAMES_N (e.g., video signals). The capture devices 110a-110n may present the signals FRAMES_A-FRAMES_N to the inputs 120a-120n of the processor 112. The signals FRAMES_A-FRAMES_N may represent the video frames/video data. The signals FRAMES_A-FRAMES_N may be video streams captured by the capture devices 110a-110n. In some embodiments, the capture devices 110a-110n may be implemented in the camera 58. In some embodiments, the capture devices 110a-110n may be configured to add to existing functionality to the camera 58.

Each of the capture devices 110a-110n may comprise a block (or circuit) 130, a block (or circuit) 132, and/or a block (or circuit) 134. The circuit 130 may implement a camera sensor (e.g., a complementary metal-oxide-semiconductor (CMOS) sensor). The circuit 132 may implement a camera processor/logic. The circuit 134 may implement a memory buffer. As a representative example, the capture device 110a is shown comprising the sensor 130a, the logic block 132a and the buffer 134a. The camera sensors 130a-130n may receive light from the corresponding one of the lenses 60a-60n and transform the light into digital data (e.g., the bitstreams).

In one example, the sensor 130a of the capture device 110a may receive light from the lens 60a. The camera sensor 130a of the capture device 110a may perform a photoelectric conversion of the light from the lens 60a. In some embodiments, the sensor 130a may be an oversampled binary image sensor. The logic 132a may transform the bitstream into a human-legible content (e.g., video data). For example, the logic 132a may receive pure (e.g., raw) data from the camera sensor 130a and generate video data based on the raw data (e.g., the bitstream). The memory buffer 134a may store the raw data and/or the processed bitstream. For example, the frame memory and/or buffer 134a may store (e.g., provide temporary storage and/or cache) one or more of the video frames (e.g., the video signal).

The apparatus 100 may further comprise the interface 126 configured to send/receive data (e.g., the signal DIO) to/from one or more components of the drone 52, the pilot 70 and/or other components of the camera system 100. The interface 126 may be configured to send data (e.g., instructions) from the processor 112 to the components of the drone 52. For example, the interface 126 may be bi-directional. In an example, data presented to the interface 126 may be used by the processor 112 to determine the movement of the drone 52 (e.g., to provide information to perform image stabilization, to calculate movements to determine expected rotations of objects detected by the processor 112 and/or to determine flight control output).

The interface 126 may receive information from a gyroscope sensor, information from an inertial measurement unit, information from one or more components of the drone 52, etc. In an example, the signal DIO may comprise information from the components of the drone 52 that may be used to calculate telemetry data that may be compared to telemetry information calculated by the processor 112 by analyzing the video data captured (e.g., detecting and/or measuring the horizon captured in the video data). The type of data and/or the number of components of the drone 52 that provide data may be varied according to the design criteria of a particular implementation.

The processor 112 may be configured to execute computer readable code and/or process information. The processor 112 may be configured to receive input and/or present output to the memory 114. The processor 112 may be configured to present and/or receive other signals (not shown). The number and/or types of inputs and/or outputs of the processor 112 may be varied according to the design criteria of a particular implementation.

The processor 112 may receive the signals FRAMES_A-FRAMES_N, the signal DIO and/or the signal DATA. The processor 112 may make a decision based on data received at the inputs 120a-120n, the input 122, the input 126 and/or other input. For example other inputs may comprise external signals generated in response to user input, external signals generated by the drone 52 and/or internally generated signals such as signals generated by the processor 112 in response to analysis of the signals FRAMES_A-FRAMES_N and/or objects detected in the signals FRAMES_A-FRAMES_N. The processor 112 may adjust the video data (e.g., crop, digitally move, physically move the camera sensor 130, etc.) of the signals FRAMES_A-FRAMES_N. The processor 112 may generate the signal VIDEO in response data received by the inputs 120a-120n, the input 122, the input 126 and/or the decisions made in response to the data received by the inputs 120a-120n, the input 122 and/or the input 126.

The signal VIDEO may be generated to provide an output for the communication device 102 in response to the captured video frames (e.g., the signal FRAMES_A-FRAMES_N) and the video analytics performed by the processor 112. For example, the video analytics may be performed by the processor 112 in real-time and/or near real-time (e.g., with minimal delay). The signal VIDEO may be a live (or nearly live) video stream. The signal VIDEO may be transmitted to the playback device 54 (e.g., using RF communication) to provide the pilot 70 with a cropped view of the panoramic video captured from the perspective of the drone 52.

Generally, the signal VIDEO may correspond to the data received at the inputs 120a-120n, the input 122, the input 126 and/or enhanced (e.g., stabilized, corrected, cropped, downscaled, packetized, compressed, etc.) by the processor 112. For example, the signal VIDEO may be a stitched, corrected, stabilized, cropped and/or encoded version of the signals FRAMES_A-FRAMES_N. The processor 112 may further encode and/or compress the signals FRAMES_A-FRAMES_N to generate the signal VIDEO.

The cropping, downscaling, blending, stabilization, packetization, encoding, compression and/or conversion performed by the processor 112 may be varied according to the design criteria of a particular implementation. For example, the signal VIDEO may be a processed version of the signals FRAMES_A-FRAMES_N configured to fit the target area to the shape and/or specifications of the playback device 54 and/or to emulate a view from the perspective of the drone 52. For example, the playback device 54 may be implemented for real-time video streaming of the signal VIDEO received from the apparatus 100.

Generally, the signal VIDEO is some view (or derivative of some view) captured by the capture devices 110a-110n. The signal VIDEO may comprise a portion of the panoramic video captured by the capture devices 110a-110n. The signal VIDEO may be a video frame comprising the region of interest selected and/or cropped from the panoramic video frame by the processor 112. The signal VIDEO may have a smaller size than the panoramic video frames FRAMES_A-FRAMES_N. In some embodiments, the signal VIDEO may provide a series of cropped and/or enhanced panoramic video frames that improves upon the view from the perspective of the drone 52 (e.g., provides night vision, provides High Dynamic Range (HDR) imaging, provides more viewing area, highlights detected objects, provides additional data such as a numerical distance to detected objects, provides visual indicators for paths of a race course, etc.).

The memory 114 may store data. The memory 114 may be implemented as a cache, flash memory, DRAM memory, etc. The type and/or size of the memory 114 may be varied according to the design criteria of a particular implementation. The data stored in the memory 114 may correspond to a video file, status information (e.g., readings from the components of the drone 52, pre-selected fields of view, user preferences, user inputs, etc.) and/or metadata information.

The communication device 102 may send and/or receive data to/from the apparatus 100. In some embodiments, the communication device 102 may be implemented as a wireless communications module. In some embodiments, the communication device 102 may be implemented as a satellite connection to a proprietary system. In one example, the communication device 102 may be a hard-wired data port (e.g., a USB port, a mini-USB port, a USB-C connector, HDMI port, an Ethernet port, a DisplayPort interface, a Lightning port, etc.). In another example, the communication device 102 may be a wireless data interface (e.g., Wi-Fi, Bluetooth, ZigBee, cellular, etc.).

The lenses 60a-60n (e.g., camera lenses) may be directed to provide a panoramic view from the drone 52. The lenses 60a-60n may be aimed to capture environmental data (e.g., light). The lens 60a-60n may be configured to capture and/or focus the light for the capture devices 110a-110n. Generally, the camera sensor 130 is located behind each of the lenses 60a-60n. Based on the captured light from the lenses 60a-60n, the capture devices 110a-110n may generate a bitstream and/or video data.

Data from the components of the drone 52 may be presented to the apparatus 100 at the input 126 as the signal DIO. The number and/or types of the components of the drone 52 may be varied according to the design criteria of a particular implementation. The data from the components of the drone 52 may be used by the camera system 100 to determine a movement direction of the drone 52. In one example, location-related information may be determined by a location module (e.g., to determine weather conditions for the current location of the drone 52). For example, the location module may be implemented as a GPS sensor. Orientation information may be determined by an orientation module. For example, the orientation module may be implemented as a magnetometer, an accelerometer and/or a gyroscope. In yet another example, temperature information may be determined by a temperature module. For example, the temperature module may be implemented as a thermometer. The types of the components of the drone 52 used to implement the location module, the orientation module, the temperature module and/or any other types of sensors may be varied according to the design criteria of a particular implementation.

Different communication channels may be implemented to transmit video and drone control. In an example, the communication module 102 may implement one communication channel to transmit video and a different communication channel for drone control (e.g., movements input by the pilot 70 using the remote control 56). In another example, the drone 52 may comprise the communication module 102 to implement one channel to transmit the signal VIDEO and a separate remote-control (RC) transmitter to implement a different channel for drone control. Example frequencies may comprise 900 MHz, 1.2 GHz, 2.4 GHz and/or 5.8 GHz. In an example, if the drone 52 uses a RC transmitter on one of the frequencies for control, then, in order to avoid interference, another one of the frequencies should be selected for the communication module 102. In some embodiments, an option may be provided to select a sub-frequency for each pilot. In some embodiments, the wireless communication module 102 may automatically select a sub-frequency for each pilot. For example, many video transmitters operate at 5.8 GHz. Other frequencies may be implemented. The channels used for a particular type of communication (e.g., video, region of interest data or control) and/or the frequencies used may be varied according to the design criteria of a particular implementation.

Embodiments of the apparatus 100 may perform video stitching operations on the signals FRAMES_A-FRAMES_N. In one example, each of the video signals FRAMES_A-FRAMES_N may provide a portion of a panoramic view and the processor 112 may crop, blend, synchronize and/or align the signals FRAMES_A-FRAMES_N to generate the panoramic video signal VIDEO. In some embodiments, the processor 112 may be configured to perform electronic image stabilization (EIS). The processor 112 may perform de-warping on the signals FRAMES_A-FRAMES_N. The processor 112 may perform intelligent video analytics on the de-warped video frames FRAMES_A-FRAMES_N. The processor 112 may encode the signals FRAMES_A-FRAMES_N to a particular format.

The cropped and/or enhanced portion of the panoramic video generated by the processor 112 may be sent to the output 124 (e.g., the signal VIDEO). In one example, the signal VIDEO may be an HDMI output. In another example, the signal VIDEO may be a composite (e.g., NTSC) output (e.g., composite output may be a low-cost alternative to HDMI output). In yet another example, the signal VIDEO may be a S-Video output. In some embodiments, the signal VIDEO may be an output sent via interfaces such as USB, SDIO, Ethernet and/or PCIe. The portion of the panoramic video signal VIDEO may be output to the wireless communication device 102. In an example, the wireless communication device 102 may be a RF transmitter.

The video generated by the processor 112 may also be used to implement a panoramic video having high-quality video in the region of interest. The video generated by the processor 112 may be used to implement a panoramic video that reduces bandwidth needed for transmission by cropping out the portion of the panoramic that has not been selected by the intelligent video analytics as the region of interest. To generate a high-quality, enhanced video using the region of interest, the processor 112 may be configured to perform encoding, blending, cropping, aligning and/or stitching.

The encoded video may be stored locally and/or transmitted wirelessly to external storage (e.g., network attached storage, cloud storage, etc.). In an example, the encoded, panoramic video may be stored locally by the memory 114. In another example, the encoded, panoramic video may be stored to a hard-drive of a networked computing device. In yet another example, the encoded, panoramic video may be transmitted wirelessly without storage. The type of storage implemented may be varied according to the design criteria of a particular implementation.

The processor 112 may be configured to send analog and/or digital video out (e.g., the signal VIDEO) to the video communication device 102. In some embodiments, the signal VIDEO generated by the apparatus 100 may be a composite and/or HDMI output. The processor 112 may receive an input for the video signal (e.g., the signals FRAMES_A-FRAMES_N) from the CMOS sensor(s) 130a-130n. The input video signals FRAMES_A-FRAMES_N may be enhanced by the processor 112 (e.g., color conversion, noise filtering, auto exposure, auto white balance, auto focus, etc.).

Figure 3:
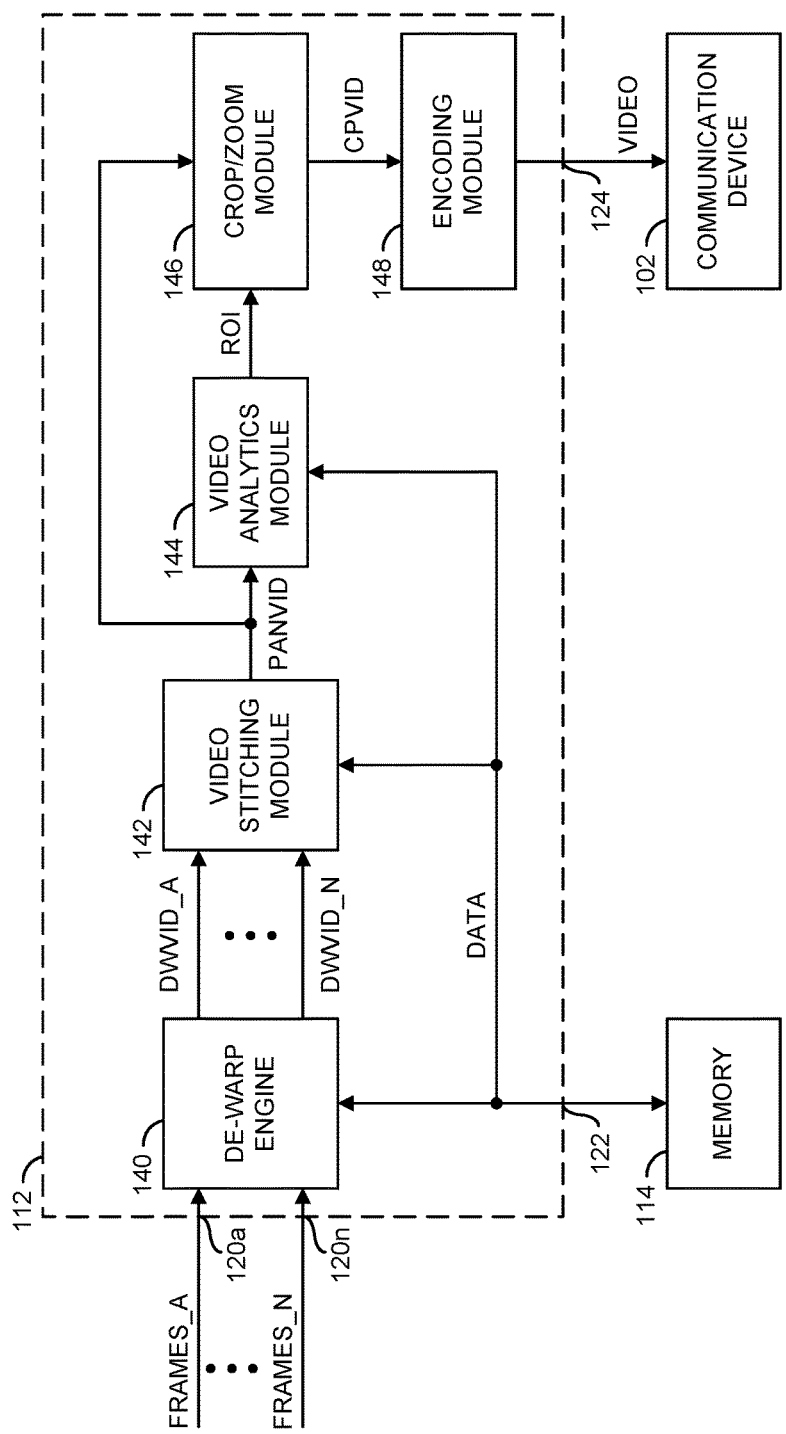
FIG. 3 is a block diagram illustrating example components of a processor configured to implement de-warping and video analytics.

Referring to FIG. 3, a block diagram illustrating example components of the processor 112 configured to implement de-warping and video analytics is shown. The processor 112 may comprise a block (or circuit) 140, a block (or circuit) 142, a block (or circuit) 144, a block (or circuit) 146 and/or a block (or circuit) 148. The circuit 140 may implement a de-warp engine. The circuit 142 may implement a video stitching module. The circuit 144 may implement a video analytics module. The circuit 146 may implement a crop/zoom module. The circuit 148 may implement an encoding module. The processor 112 may comprise other circuits and/or modules (not shown). The number, layout and/or types of circuitry implemented by the processor 112 may be varied according to the design criteria of a particular implementation.

The de-warp engine 140 may receive one or more of the signals FRAMES_A-FRAMES_N. The signals FRAMES_A-FRAMES_N may be received from the input interface 120a-120n of the processor 112. The de-warp engine 140 may be configured to send and/or receive the signal DATA to/from the memory 114, the video stitching module 142 and/or the video analytics module 144. The de-warp engine 140 may generate one or more signals (e.g., DWVID_A-DWVID_N).

The processor 112 may implement the hardware de-warp engine 140. In an example, the hardware de-warp engine 140 may be implemented within the camera system on chip (SoC) 100. The hardware de-warp engine 140 may be configured to de-warp the panoramic video captured by the wide angle camera 58. In some embodiments, the de-warped image may be stored in the memory 114. In one example, the memory 114 may be implemented using flash memory (e.g., SD cards).

The signals FRAMES_A-FRAMES_N captured by the capture devices 110a-110n may be warped. The capture devices 110a-110n may cause distortion. In one example, the lenses 60a-60n may be implemented as wide-angle lenses. The wide-angle lenses 60a-60n may warp (e.g., distort) the light captured by the sensors 130a-130n. The distortion (e.g., warping) caused by the wide-angle lenses 60a-60n may cause difficulty recognizing visual content captured (e.g., when the video is viewed by a human and/or analyzed by a video processor). In one example, the visual content may appear elongated. In another example, the visual content may have an incorrect perspective (e.g., closer objects may be unnaturally large and farther objects may be unnaturally small).

The de-warping operations performed by the hardware de-warp engine 140 may adjust the visual content of the signals FRAMES_A-FRAMES_N. The adjustments performed by the de-warp engine 140 may cause the visual content to appear natural (e.g., appear as seen by a person). The de-warping operations performed by the hardware de-warp engine 140 may be implemented to correct the distortion caused by the capture devices 110a-110n. The adjusted visual content may be presented by the de-warp engine 140 as the signals DWVID_A-DWVID_N.

Implementing the de-warp engine 140 as a hardware module may increase the video processing speed of the processor 112. The hardware implementation of the de-warp engine 140 may de-warp the signals FRAMES_A-FRAMES_N faster than a software implementation. The hardware implementation of the de-warp engine 140 may enable the video to be processed while reducing an amount of delay. For example, with the hardware implementation, the pilot 70 may be able to view the output on the playback device 54 and see a relatively accurate representation of the current location of the drone 52 (e.g., low lag). The hardware implementation of the de-warp engine 140 may implement the various calculations used to de-warp the signals FRAMES_A-FRAMES_N using hardware components. The hardware components used may be varied according to the design criteria of a particular implementation.

The video stitching module 142 may receive the signals DWVID_A-DWVID_N. The video stitching module 142 may be configured to send and/or receive the signal DATA to/from the memory 114, the de-warp engine 140 and/or the video analytics module 144. The video stitching module 142 may generate a signal (e.g., PANVID).

The video stitching module 142 may be configured to perform video stitching operations. The video stitching operations may comprise combining the video data received from the signals DWVID_A-DWVID_N to create a single panoramic video (e.g., the signal PANVID).

In an example, each of the lenses 60a-60n may be directed to capture a different field of view. The video stitching operations may combine (e.g., stitch) the fields of view captured by the lenses 60a-60n to generate the panoramic video having one field of view (e.g., in one example, a 360 degree field of view). In some embodiments, portions of the fields of view captured by the lenses 60a-60n may overlap. The video stitching operations performed by the video stitching module 142 may be configured to take into account the overlapping portions (e.g., to generate a continuous image). The video stitching operations may be configured to reduce visual artifacts (e.g., discontinuities) when combining the signals DWVID_A-DWVID_N. The signal PANVID may be the de-warped, stitched panoramic video.

The video stitching module 142 may be an optional component. In one example, the camera 58 may comprise the single lens 60a (e.g., a wide-angle lens). The wide angle lens 60a and/or the capture device 110a may provide the warped video signal FRAMES_A. The signal FRAMES_A may be the panoramic video. The de-warp engine 140 may de-warp the signal FRAMES_A. The de-warp engine 140 may generate the signal PANVID. In some embodiments, the video stitching operations may be performed before the de-warping operations.

The video analytics module 144 may receive the signal PANVID. The video analytics module 144 may be configured to send and/or receive the signal DATA to/from the memory 114, the de-warp engine 140 and/or the video stitching module 142. The video analytics module 144 may generate a signal (e.g., ROI).

The video analytics module 144 may be configured to perform intelligent video analytics. In an example, video analytics may be performed after the de-warping is performed by the de-warp engine 140. Intelligent video analytics may be implemented on the de-warped video image (e.g., the signal PANVID). The video analytics may be configured to identify objects (e.g., items and/or people of interest).

The intelligent video analytics performed by the video analytics module 144 may comprise analyzing, understanding and/or interpreting digital video to produce numerical and/or symbolic information about the digital video. The numerical and/or symbolic information may be used for interpreting visual information about the digital video (e.g., the signal PANVID). In an example, the intelligent video analytics may comprise computer vision.

In some embodiments, the video analytics module 144 may be configured to extract data (e.g., the numerical and/or symbolic information) from the signal PANVID. The extracted data may be used to determine the visual content of the panoramic video. Determining the visual content may comprise recognizing objects. In one example, the video analytics module 144 may interpret the numerical and/or symbolic information to recognize that the visual data represents a person. In some embodiments, the number of pixels and/or the colors of the pixels of the signal PANVID may be used to recognize portions of the signal PANVID as objects. The types of objects recognized by the video analytics module 144 may be varied according to the design criteria of a particular implementation.

The memory 114 may store numerical and/or symbolic information of known objects (e.g., the shapes/colors associated with a person, the shapes/colors associated with a vehicle, the shapes/colors associated with animals, etc.). The video analytics module 144 may receive the information associated with known objects in the signal DATA. The video analytics module 144 may compare the information in the signal DATA with the numerical and/or symbolic information extracted from the signal PANVID. The video analytics module 144 may select the region of interest of the panoramic video based on the detected objects.

The intelligent video analytics may comprise one or more functions. In one example, one of the functions implemented as part of the intelligent video analytics may be a "person detection". The video analytics may identify a particular person in the de-warped video frame. In another example, one of the functions implemented as part of the intelligent video analytics module 144 may be a "follow me" function. The video analytics module 144 may recognize a particular object over multiple video frames (e.g., from one frame to a future frame) and follow the object. For example, the video analytics module 144 may identify a person and follow the identified person. In another example, the video analytics module 144 may identify the drone pilot 70. In yet another example, the video analytics module 144 may follow an identified player as the player engages in a sporting activity.

In some embodiments, the apparatus 100 may generate flight commands (e.g., the signal DIO) for the drone 52 based on the video analytics. In one example, the flight commands may be generated to avoid obstacles detected using the video analytics module 144. In another example, the flight commands may be generated to enable the drone 52 to follow an identified object as the identified objects moves (e.g., follow a skier as the skier travels down a path, follow a long-distance runner across a course, etc.).

The video analytics module 144 may be configured to select a region of interest. The region of interest may be selected based on the objects that have been identified (e.g., using the intelligent video analytics). The apparatus 100 (e.g., the camera system-on-chip) may use the information generated in response to the video analytics performed by the video analytics module 144 to select the region of interest in the panoramic video stream. The video analytics module 144 may present the coordinates of the selected region of interest as the signal ROI. In an example, the signal ROI may comprise coordinates corresponding to the signal PANVID indicating which sections of the panoramic video to crop out. The coordinate system used to indicate the region of interest and/or the size of the region of interest may be varied according to the design criteria of a particular implementation.

The crop/zoom module 146 may receive the signal PAN-VID. The crop/zoom module 146 may receive the signal ROI. The crop/zoom module 146 may generate a region of interest video frame. The crop/zoom module 146 may present a signal (e.g., CPVID).

The crop/zoom module 146 may be configured to crop the region of interest from the panoramic video frame (e.g., generate the region of interest video frame). The crop/zoom module 146 may receive the panoramic video signal PAN-VID from the de-warp engine 140 and/or the video stitching module 142. The crop/zoom module 146 may use the coordinates in the signal ROI (e.g., the selected region of interest) to determine the portion of the panoramic video to crop. The cropped region of interest video frame may be presented as the signal CPVID.

Cropping the region of interest selected using the video analytics performed by the video analytics module 144 may generate a second image. The cropped image CPVID (e.g., the region of interest video frame) may be smaller than the panoramic video PANVID (e.g., the cropped image may be a portion of the panoramic video). The region of interest may be dynamically adjusted based on the movement of the detected objects and/or the movement of the drone 52. For example, the detected object may not be moving, but the location of the detected object may move between the video frames as the drone 52 moves. The video analytics module 144 may update the selected region of interest coordinates ROI and the crop/zoom module 146 may dynamically update the cropped section CPVID (e.g., the video analytics module 144 may dynamically update the region of interest based on the objects detected using the video analytics). The cropped section of the panoramic video may correspond to the region of interest selected. As the region of interest changes, the cropped portion of the panoramic video (e.g., the region of interest video frame) may change. For example, the selected coordinates for the ROI may change from frame to frame, and the crop/zoom module 146 may be configured to crop the selected region in each frame. For each frame of the panoramic video PANVID, the crop/zoom module 146 may be configured to crop different coordinates, based on the signal ROI.

The crop/zoom module 146 may be configured to digitally zoom into an area of a video frame. The crop/zoom module 146 may digitally zoom into the cropped region of interest video frame. For example, the video analytics module 144 may establish the region of interest using video analytics (e.g., generate the signal ROI), the crop/zoom module 146 may crop the region of interest, then the crop/zoom module 146 may digitally zoom into the cropped region of interest video frame. In some embodiments, the crop/zoom module 146 may be configured to combine the digital zoom with over-sampling of the image sensors 130a-130n. The over-sampling of the image sensors 130a-130n may result in a higher resolution image. The higher resolution images generated by the crop/zoom module 146 may be within total size constraints of the cropped region.

In some embodiments, the digital zooming by the crop/zoom module 146 may be optional. For example, the digital zoom and/or the amount of digital zooming may be a user selected option. The cropping performed by the crop/zoom module 146 may generate a portion of the panoramic video PANVID. The digital zoom may be performed by the crop/zoom module 146 on the portion of the panoramic video. The cropped and/or zoomed portion CPVID may be presented by the crop/zoom module 146.

The encoding module 148 may receive the signal CPVID. The encoding module 148 may generate the signal VIDEO. The signal VIDEO may be transmitted to the output interface 124 of the processor 112. The signal VIDEO may be an enhanced region of interest video frame. The enhanced region of interest video frame may be smaller than a frame of the de-warped panoramic video stream PANVID. The signal VIDEO may be received by the communication device 102.

The encoding module 148 may be configured to encode the cropped portion of the panoramic video CPVID. The encoding performed by the encoding module 148 may format (e.g., process, transcode, packetize, compress, etc.) the cropped region of interest video frame CPVID for transmission and/or playback. In an example, the encoding performed by the encoding module 148 may format the cropped region of interest video frame CPVID based on the specifications of the communication device 102 and/or the playback device 54 (e.g., ensure compatibility). The type of encoding performed by the encoding module 148 may be varied according to the design criteria of a particular implementation.

The encoding module 148 may be configured to enhance the cropped region of interest video frame CPVID to generate the enhanced region of interest video frame VIDEO. In one example, the enhancement performed by the encoding module 148 may provide night vision. In another example, the enhancement performed by the encoding module 148 may provide High Dynamic Range (HDR) imaging. In yet another example, the enhancement performed by the encoding module 148 may highlight the detected objects. The enhancements performed by the encoding module 148 may be provided as user-selected options.

In some embodiments, the processor 112 may be configured to enhance the captured video. Generally, the enhancements performed by the components of the processor 112 may improve upon and/or adjust the view captured from the perspective of the drone 52. Enhancements performed by the crop/zoom module 146 may comprise cropping and/or digital zooming the panoramic video. Enhancements may comprise providing more viewing area, highlighting detected objects, provides additional data such as a numerical distance to detected objects, providing visual indicators for paths taken by detected objects, etc.). The enhancements performed by the components of the processor 112 may be varied according to the design criteria of a particular implementation.

Figure 4:
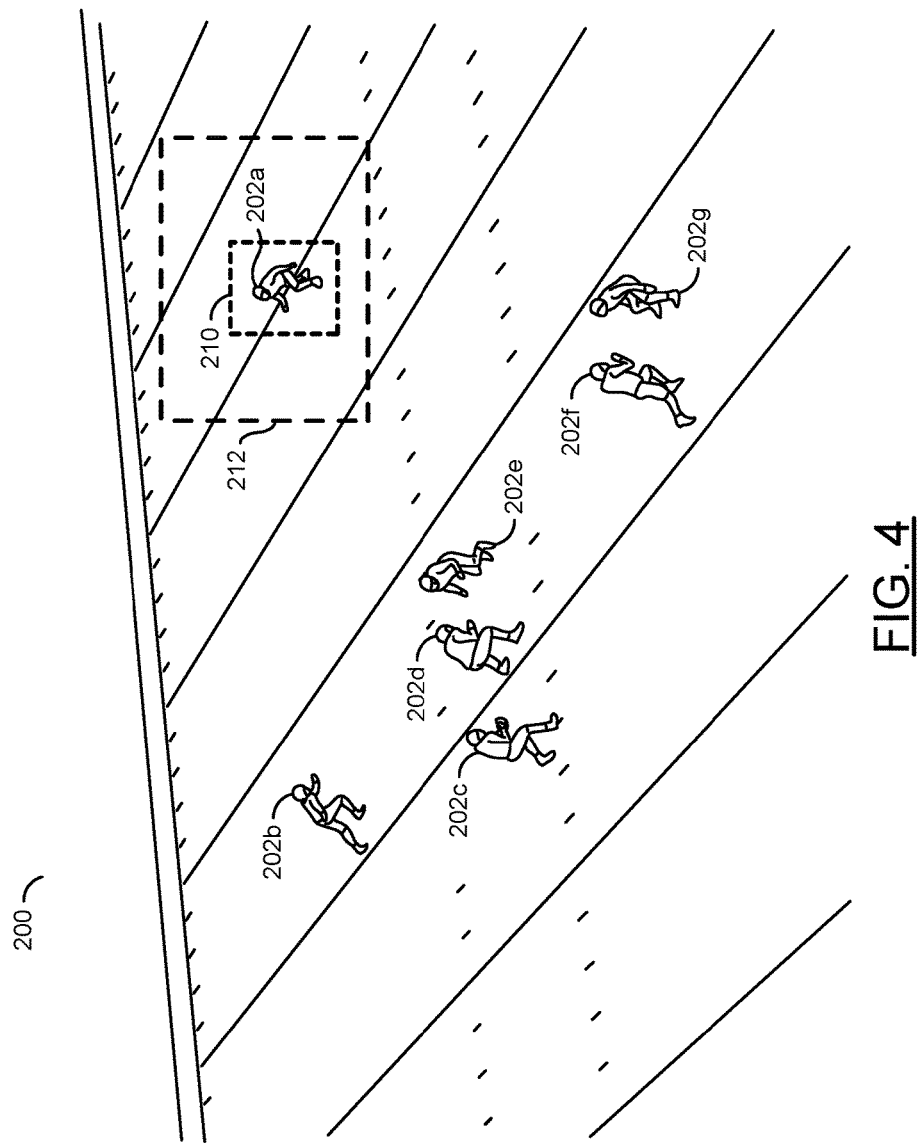
FIG. 4 is a diagram illustrating a de-warped panoramic video.

Referring to FIG. 4, a diagram illustrating a de-warped panoramic video is shown. A panoramic video frame 200 is shown. The panoramic video frame 200 may be a de-warped video frame (e.g., no visual distortion is present) generated by the de-warp engine 140. The panoramic video frame 200 may be an example video frame from the panoramic video signal PANVID. In the example shown, the panoramic video frame 200 may provide a view of a football field (e.g., the drone 52 may be flying over a football field capturing images of a game).

In the video frame 200, a number of football players 202a-202g are shown. Each of the players 202a-202g may be an example of an object that may be detected by the video analytics performed by the video analytics module 144. In the example shown, the object 202a may be selected by the video analytics module 144. The object 202a may be selected instead of other potential objects (e.g., the players 202b-202g) in response to various parameters of the processor 112 and/or user-selected settings.

A box 210 is shown around the object 202a. The box 210 may indicate that the object 202a is the object identified and/or selected by the video analytics module 144. The box 210 is shown as a representative example to indicate the player 202a is the object identified by the video analytics module 144. In some embodiments, the box 210 may not be visible on the panoramic video frame 200. In some embodiments, the box 210 may be visible on the panoramic video frame 200. For example, the box 210 may be one of the enhancements added by the encoding module 148 (e.g., to provide a visual indication of the player 202a selected as the identified object 210). The region of interest may be selected by the video analytics module 144 based on the location of the player 202a that has been selected as the identified object 210.

A box 212 is shown. The box 212 may represent the location of the region of interest selected by the video analytics module 144. In an example, the signal ROI may present the coordinates of the region of interest 212 to the crop/zoom module 146. The region of interest 212 may be a portion of the panoramic video 200 (e.g., a size of the region of interest 212 may be less than a size of the panoramic video 200). The region of interest 212 is shown as a representative example to indicate a location and/or size of the region of interest selected by the video analytics module 144. In some embodiments, the region of interest 212 may not be visible on the panoramic video frame 200. In some embodiments, the region of interest 212 may be visible on the panoramic video frame 200. For example, the region of interest 212 may be one of the enhancements added by the encoding module 148 (e.g., to provide a visual indication of the selected region of interest 212).

The region of interest 212 is shown generally centered around the identified object 210. The video analytics module 144 may select the region of interest 212 based on an area of the panoramic video 200 near the identified object 210. For example, the video analytics module 144 may analyze the video near the identified object 210 to determine other objects, visual patterns, and/or a composition of visual elements. For example, if the player 202a (e.g., the identified object 210) has no other players nearby, as shown, the video analytics module 144 may center the identified object 210 in the region of interest 212. In another example, if the player 202a (e.g., the identified object 210) has other players nearby (or the football is nearby), the video analytics module 144 may select the region of interest 212 to provide a better composition for the cropped video frame. The location of the region of interest 212 with respect to the identified object 210 may be varied according to the design criteria of a particular implementation.

Figure 5:
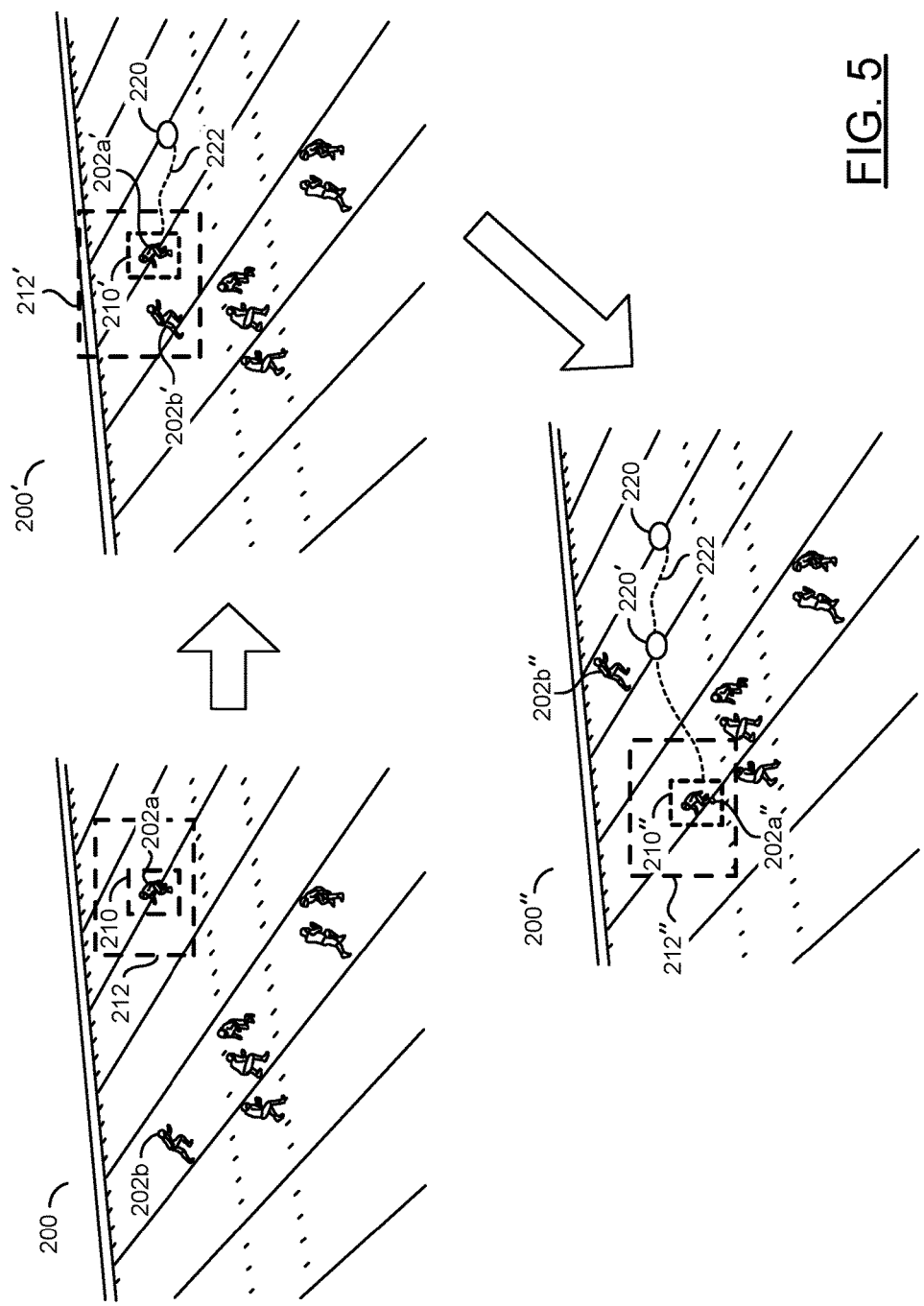
FIG. 5 is a diagram illustrating a detected object tracked over video frames using video analytics.

Referring to FIG. 5, a diagram illustrating a detected object tracked over video frames using video analytics is shown. The panoramic video frame 200 is shown. A panoramic video frame 200' is shown. A panoramic video frame 200'' is shown. The panoramic video frame 200' may be a frame captured some time after the panoramic video frame 200. The panoramic video frame 200'' may be a frame captured some time after the panoramic video frame 200'.

The video analytics module 144 may be configured to track the identified object 210 from video frame to video frame. The video analytics module 144 may dynamically select the region of interest 212 based on the location of the identified object 210 from video frame to video frame.

The video analytics module 144 may receive the panoramic video frame 200. The video analytics module 144 may select the identified object 210 and determine the location for the region of interest 212 for the video frame 200. The video analytics module 144 may receive the next panoramic video frame 200'. The video analytics module 144 may perform the intelligent video analytics on the panoramic video frame 200' to identify the same object (e.g., the player 202a').

In the example shown, the player 202a' may have moved from the time when the video frame 200 was captured and the time when the video frame 200' was captured. An indicator 220 is shown on the panoramic video frame 200'. The indicator 220 may represent a previous location of the identified object (e.g., the location of the identified object 210 at the time of capture of the panoramic video frame 200). The indicator 220 is shown as a representative example to indicate the previous location of the identified object 210 identified by the video analytics module 144. In some embodiments, the indicator 220 may not be visible on the panoramic video frame 200'. In some embodiments, the indicator 220 may be visible on the panoramic video frame 200'. For example, the indicator 220 may be one of the enhancements added by the encoding module 148 (e.g., to provide a visual indication of the previous location of the identified object 210).

The video analytics module 144 may be configured to follow the movement of the identified object 210 and/or dynamically update the location of the selected region of interest 212. In the panoramic video frame 200', the identified object 210' is shown as the player 202a'. The selected region of interest 212' is shown as a portion of the panoramic video 200' that contains the identified object 210'. For example, the location of the region of interest 212' for the panoramic video frame 200' has moved from the location of the region of interest 212 for the panoramic video frame 200 (e.g., the region of interest may be dynamically selected).

In the example shown for the panoramic video frame 200', the identified object 210' is not centered within the selected region of interest 212'. For example, the video analytics module 144 may determine that the player 202b' is near the identified object 210'. To improve the composition of the selected region of interest 212', the video analytics module 144 may select the coordinates such that the region of interest 212' contains both the identified object 210' and the player 202b'.

A line 222 is shown on the panoramic video frame 200'. The line 222 may represent a path of the identified object 210'. The path 222 may be determined by the video analytics module 144 tracking the detected object 210' across multiple video frames. The path 222 is shown as a representative example to indicate the movement tracking of the identified object 210' by the video analytics module 144. In some embodiments, the path 222 may not be visible on the panoramic video frame 200'. In some embodiments, the path 222 may be visible on the panoramic video frame 200'. For example, the path 222 may be one of the enhancements added by the encoding module 148 (e.g., to provide a visual indication of the movement of the identified object 210').

The video analytics module 144 may receive the next panoramic video frame 200". The video analytics module 144 may perform the intelligent video analytics on the panoramic video frame 200" to identify the same object (e.g., the player 202a").

In the example shown, the player 202a" may have moved from the time when the video frame 200' was captured and the time when the video frame 200" was captured. An indicator 220' and the indicator 220 are shown on the panoramic video frame 200". The indicator 220' and/or the indicator 220 may represent a previous location of the identified object (e.g., the location of the identified object 210 at the time of capture of the panoramic video frame 200 and the location of the identified object 210' at the time of capture of the panoramic video frame 200').

The video analytics module 144 may be configured to follow the movement of the identified object 210 and/or dynamically update the location of the selected region of interest 212. In the panoramic video frame 200", the identified object 210" is shown as the player 202a". The selected region of interest 212" is shown as a portion of the panoramic video 200" that contains the identified object 210". For example, the location of the region of interest 212" for the panoramic video frame 200" has moved from the location of the region of interest 212' for the panoramic video frame 200'.

In the example shown for the panoramic video frame 200", the identified object 210" is generally centered within the selected region of interest 212". For example, the video analytics module 144 may determine that the player 202b" is no longer near the identified object 210" and/or no other objects of interest are near the identified object 210". To improve the composition of the selected region of interest 212", the video analytics module 144 may select the coordinates such that the region of interest 212" contains the identified object 210" as the central visual element of the region of interest 212".

Figure 6:
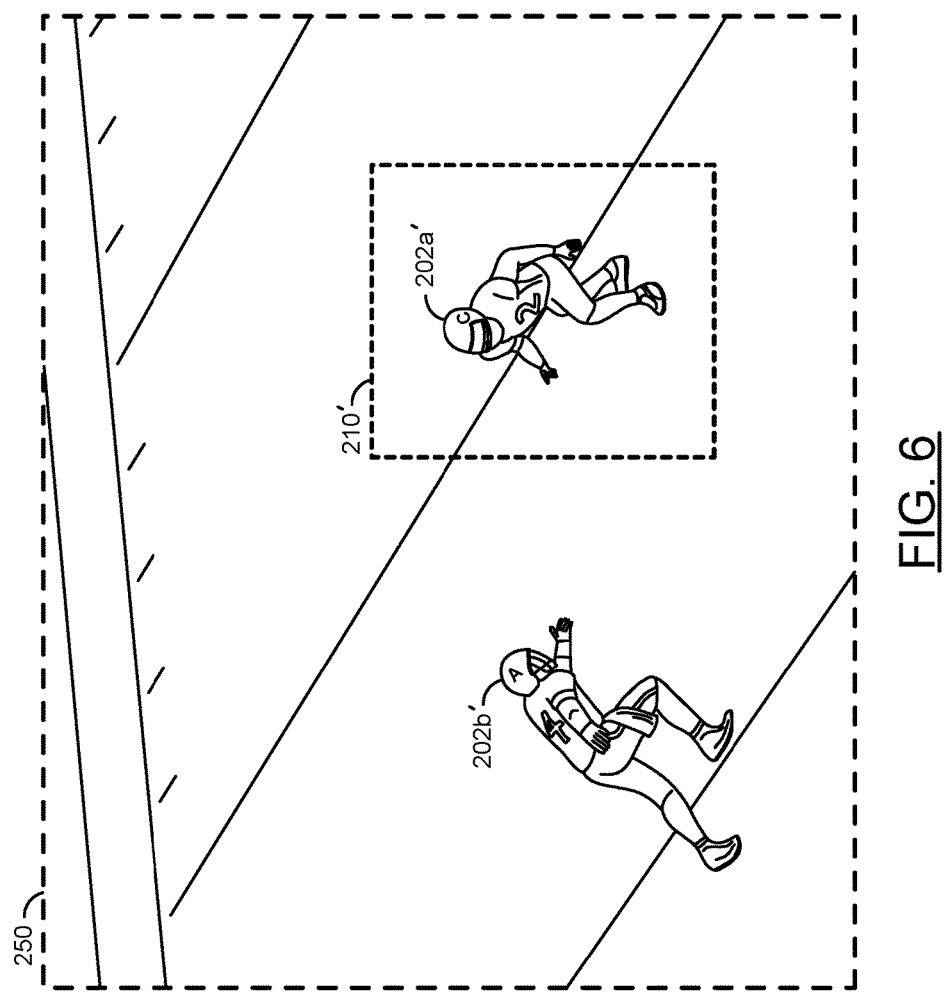
FIG. 6 is a diagram illustrating a cropped and zoomed region of interest.

Referring to FIG. 6, a diagram illustrating a cropped and zoomed region of interest 250 is shown. The cropped and zoomed region of interest 250 (e.g., the enhanced region of interest video frame) may be the region of interest 212' selected from the panoramic video frame 200' shown in association with FIG. 5. In an example, the video analytics module 144 may analyze the panoramic video frame 200', identify the object 210' and select the region of interest 212'. The crop/zoom module 146 may be configured to crop the region of interest 212' from the panoramic video frame 200'. The crop/zoom module 146 may be configured to digitally zoom in on the cropped region of interest video frame 212' to generate the enhanced region of interest video frame 250. In some embodiments, the crop/zoom module 146 and/or the encoding module 148 may be configured to generate enhancements for the enhanced region of interest video frame 250. In an example, the enhanced region of interest video frame 250 may be presented as the signal VIDEO.

Cropping the region of interest 212' from the panoramic video frame 200' may reduce an amount of data (or bandwidth) used for storing and/or transmitting the cropped and zoomed region of interest 250. The digitally zooming performed to generate the enhanced region of interest video frame 250 may increase an amount of visible detail for the video frame. For example, in the panoramic video frame 200' (shown in FIG. 5), the player 202a' and the player 202b' may be visible, but not much detail may be visible. In the enhanced region of interest video frame 250, the player 202a' and the player 202b' are shown. In the enhanced region of interest video frame 250, a greater amount of detail may be visible compared to an amount of detail in the panoramic video frame 200'. For example, additional detail comprising a logo may be visible on the helmets of the player 202a' and/or the player 202b' in the enhanced region of interest video frame 250. In another example, additional detail comprising a jersey number may be visible on the player 202a' and/or the player 202b' in the enhanced region of interest video frame 250.

The box 210' is shown around the player 202a' on the enhanced region of interest video frame 250. In some embodiments, the box 210' may be a visual indicator (e.g., an enhancement) added by the encoding module 148. In some embodiments, the box 210' may not be visible. For example, the box 210' may be shown for illustrative purposes to indicate that the player 202a' may be the detected object.

The crop/zoom module 146 may crop the region of interest video frame from the panoramic video 200'. The cropping performed by the crop/zoom module 146 may comprise cutting out the cropped region of interest video frame. The cropping may be performed to improve framing (e.g., composition) for the region of interest 212', accentuate the object of interest 210' and/or generate a video frame having a particular aspect ratio. For example, the remaining video data for the panoramic video frame 200' (e.g., the video data outside of the region of interest 212') may be discarded. In another example, the remaining video data for the panoramic video frame 200' (e.g., the video data outside of the region of interest 212') may be stored in the memory 114. The remaining video data for the panoramic video frame 200' stored in the memory 114 may be used by the video analytics module 144 to track objects, determine a composition of the region of interest and/or improve object detection (e.g., provide extra data sets for machine learning).

The smaller, cropped image (e.g., the enhanced region of interest video frame 250) generated by the apparatus 100 may have a smaller file size. The enhanced region of interest video frame 250 may be presented to the communication device 102 (e.g., as the signal VIDEO). The communication device 102 may transmit the enhanced region of interest video frame 250 from the drone 52 to the playback device 54 (e.g., to the pilot 70 for display and/or control). The transmission of the smaller sized image 250 may reduce bandwidth consumption compared to transmitting the complete panoramic video 200'.

Transmitting the smaller image 250 may reduce an amount of delay time compared to transmitting the full panoramic image 200'. Reducing an amount of delay time (e.g., latency) may enable an improved real-time response of the drone pilot 70. For example, the smaller image 250 may be completely transferred quickly. A faster transfer may result in the image seen by the pilot 70 more accurately representing the current location of the drone 52 (e.g., the drone 52 may move between a first moment in time when the image is captured and a second moment in time when the image is received by the pilot 70). More accurately representing the current location of the drone 52 may improve the response time of the pilot 70.

Figure 7:
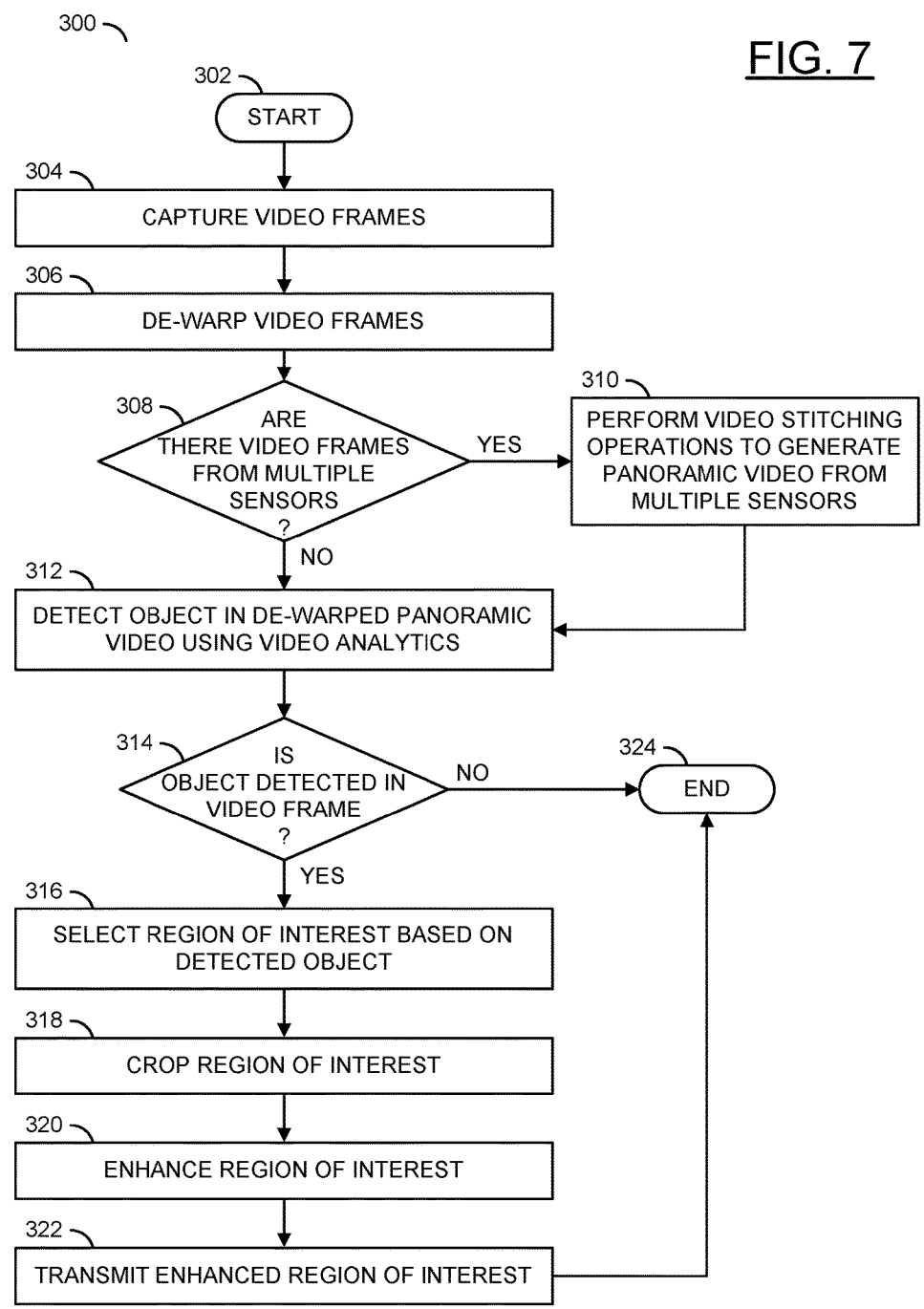
FIG. 7 is a flow diagram illustrating a method for reducing bandwidth for video streaming using de-warping and video analytics.

Referring to FIG. 7, a method (or process) 300 is shown. The method 300 may reduce bandwidth for video streaming using de-warping and video analytics. The method 300 generally comprises a step (or state) 302, a step (or state) 304, a step (or state) 306, a decision step (or state) 308, a step (or state) 310, a step (or state) 312, a decision step (or state)

314, a step (or state) 316, a step (or state) 318, a step (or state) 320, a step (or state) 322, and a step (or state) 324.

The state 302 may start the method 300. In the state 304, the camera 58 may capture video frames. For example, the capture devices 110a-110n may capture the environment near the drone 52 and present the panoramic video frames FRAMES_A-FRAMES_N to the input interface 120a-120n of the processor 112. Next, in the state 306, the de-warp engine 140 may de-warp the panoramic video frames FRAMES_A-FRAMES_N. Next, the method 300 may move to the decision state 308.

In the decision state 308, the processor 112 may determine whether there are video frames from multiple sensors (e.g., the camera sensors 130a-130n). If there are video frames from multiple sensors, the method 300 may move to the state 310. In the state 310, the video stitching module 142 may perform the video stitching operations to generate the panoramic video stream PANVID from the multiple sensors 130a-130n. Next, the method 300 may move to the state 312. In the decision state 308, if there are not video frames from multiple sensors, the method 300 may move to the state 312. For example, the video stitching module 142 may be an optional component that may not be implemented if a single camera sensor is implemented. In the state 312, the video analytics module 144 may detect the object in the de-warped panoramic video frame PANVID using video analytics. Next, the method 300 may move to the decision state 314.

In the decision state 314, the video analytics module 144 may determine whether an object has been detected in the full panoramic video frame PANVID. If there is no object detected in the video frame PANVID, the method 300 may move to the state 324. If there is an object detected in the video frame PANVID, the method 300 may move to the state 316. In the state 316, the video analytics module 144 may select the region of interest 212 based on the detected object 210. Next, the method 300 may move to the state 318.

In the state 318, the crop/zoom module 146 may crop the selected region of interest 212 from the panoramic video 200. Next, in the state 320, the crop/zoom module 146 and/or the encoding module 148 may enhance the cropped region of interest video frame 212. In the state 322, the processor 112 may transmit the enhanced region of interest 212 as the signal VIDEO. In an example, the processor 112 may transmit the signal VIDEO to the communication device 102. The communication device 102 may wirelessly transfer the signal VIDEO to the playback device 54. Next, the method 300 may move to the state 324. The state 324 may end the method 300.

Figure 8:
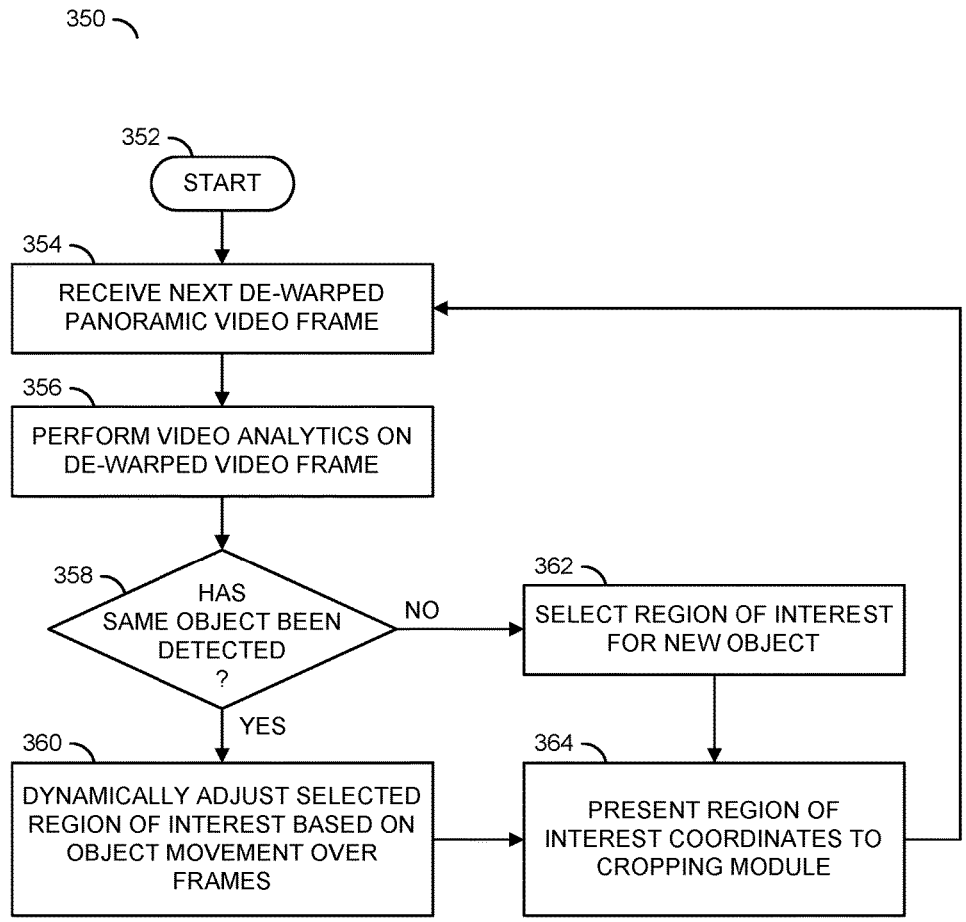
FIG. 8 is a flow diagram illustrating a method for dynamically adjusting a region of interest based on video analytics.

Referring to FIG. 8, a method (or process) 350 is shown. The method 350 may dynamically adjust a region of interest based on video analytics. The method 350 generally comprises a step (or state) 352, a step (or state) 354, a step (or state) 356, a decision step (or state) 358, a step (or state) 360, a step (or state) 362, and a step (or state) 364.

The state 352 may start the method 350. In the state 354, the video analytics module 144 may receive the next de-warped panoramic video frame PANVID. In the state 356, the video analytics module 144 may perform the intelligent video analytics on the de-warped video frame. Next, the method 350 may move to the decision state 358.

In the decision state 358, the video analytics module 144 may determine whether the same object has been detected. In an example, the video analytics module 144 may determine whether the object detected is the same object detected from a previous video frame (e.g., a location of the object may have moved, the object may have rotated, the object may have moved closer to the camera 58 and appear larger in the video frame, the object may have moved farther from the camera 58 and appear smaller in the video frame, etc.). If the object is the same object, the method 350 may move to the state 360. In the state 360, the video analytics module 144 may dynamically adjust the selected region of interest 212 based on the movements of the detected object 210 over video frames. For example, the video analytics module 144 may move the selected region of interest to track the detected object 210 as the detected object 210 moves from video frame to video frame. Next, the method 300 may move to the state 364.

In the decision state 358, if the same object has not been detected by the video analytics module 144 (e.g., a new and/or different object has been detected), the method 350 may move to the state 362. In the state 362, the video analytics module 144 may select the region of interest 212 for the new detected object. Next, the method 350 may move to the state 364. In the state 364, the video analytics module 144 may present the region of interest coordinates (e.g., the signal ROI) to the crop/zoom module 146. Next, the method 350 may return to the state 354.

Figure 9:
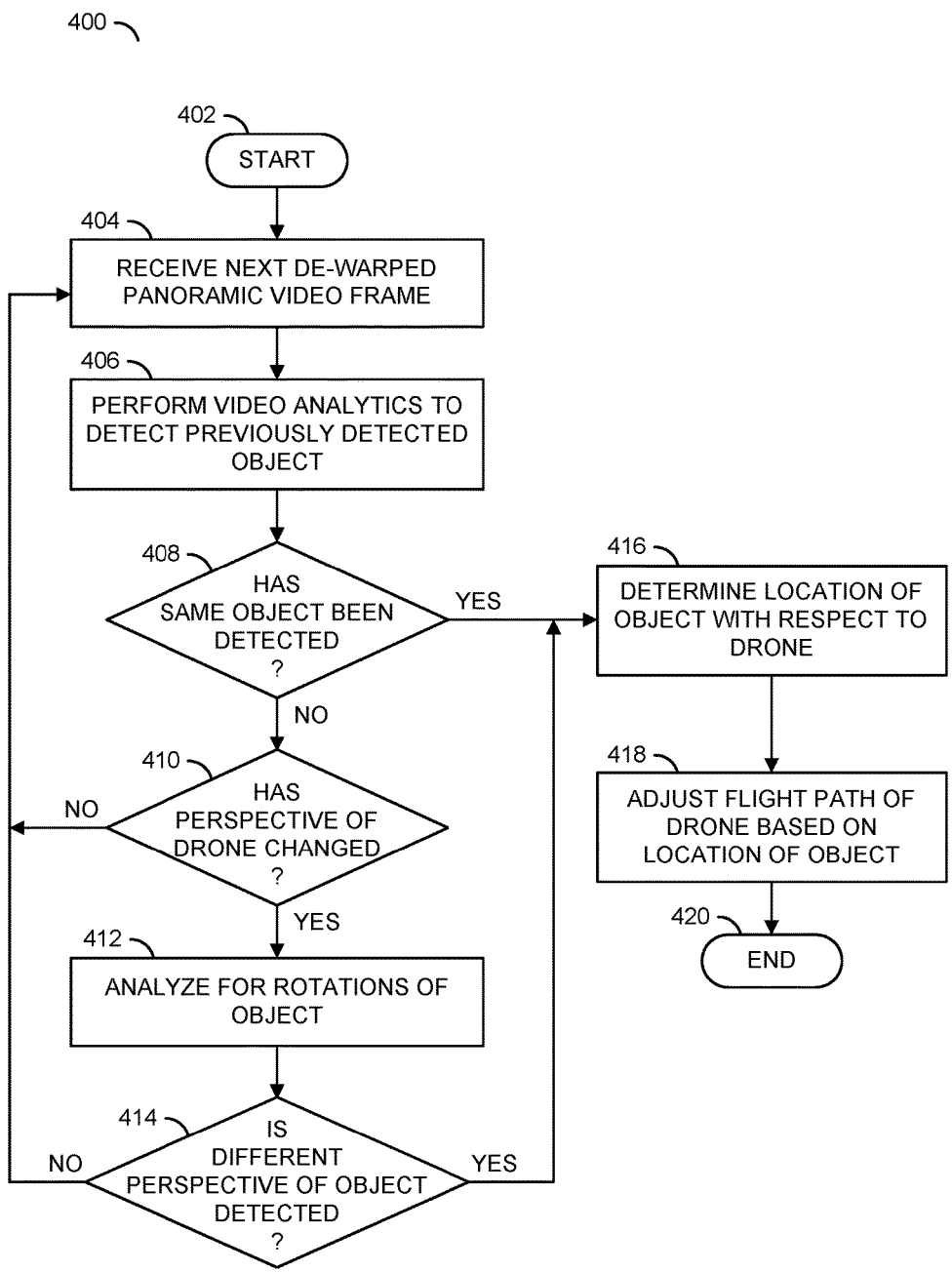
FIG. 9 is a flow diagram illustrating a method for adjusting a flight path of a drone based on video analytics.

Referring to FIG. 9, a method (or process) 400 is shown. The method 400 may adjust a flight path of a drone based on video analytics. The method 400 generally comprises a step (or state) 402, a step (or state) 404, a step (or state) 406, a decision step (or state) 408, a decision step (or state) 410, a step (or state) 412, a decision step (or state) 414, a step (or state) 416, a step (or state) 418, and a step (or state) 420.

The state 402 may start the method 400. In the state 404, the video analytics module 144 may receive the next de-warped panoramic video frame PANVID. In the state 406, the video analytics module 144 may perform video analytics to detect the previously detected object 210. Next, the method 400 may move to the decision state 408.

In the decision state 408, the video analytics module 144 may determine whether the same object has been detected (e.g., the player 202a in a first panoramic video frame 200 and the same player 202a' in a next panoramic video frame 200'). If the same object has been detected, the method 400 may move to the state 416. If the same object has not been detected, the method 400 may move to the decision state 410. In the decision state 410, the processor 112 may determine whether the perspective of the drone 52 has changed. The processor 112 may use information in the signal DIO to determine the flight path of the drone 52. For example, if the drone 52 is circling around a location, the perspective of the drone with respect to the detected object 210 may be different (e.g., the perspective may rotate from head-on to a side view). If the perspective of the drone 52 has not changed, the method 400 may return to the state 404. If the perspective of the drone has changed, the method 400 may move to the state 412.

In the state 412, the video analytics module 144 may analyze the panoramic video frame PANVID for rotations of the object 210. In an example, the memory 114 may store anatomical, ergonomic and/or physiological information about the human body and the video analytics module 144 may use the information about the human body in the memory 114 to make assumptions and/or decisions when the detected object 210 is a person. Next, the method 400 may move to the decision state 414.

In the decision state 414, the video analytics module 144 may determine whether there is a different perspective of the object 210 detected. If there is not a different perspective of the object 210, the method 400 may return to the state 404. If there is a different perspective of the object 210, the method 400 may move to the state 416. In the state 416, the processor 112 may determine the location of the object 210 with respect to the location of the drone 52. For example, the data from the video analytics module 144 may be used to determine a distance from the detected object 210. In another example, the location of the detected object 210 in the panoramic video frame PANVID may be used to determine a direction of the detected object 210. Next, in the state 418, the processor 112 may present data used to adjust the flight path of the drone 52 based on the location of the detected object 210. The processor 112 may present the signal DIO to various components of the drone 52. The components of the drone 52 may use the information in the signal DIO to adjust the flight path of the drone 52. The location information from the processor 112 may be used by the drone 52 to follow the detected object 210 as the detected object 210 moves. Next, the method 400 may move to the state 420. The state 420 may end the method 400.

Figure 10:
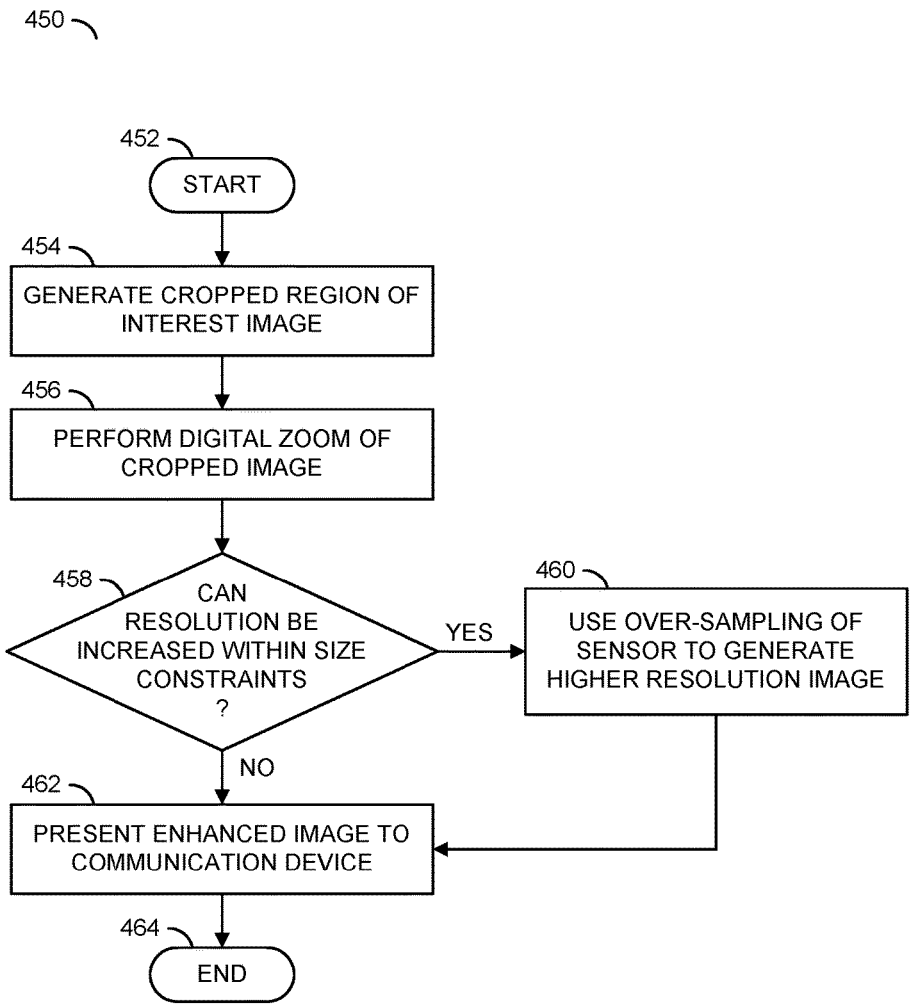
FIG. 10 is a flow diagram illustrating a method for enhancing a region of interest cropped from a panoramic video.

Referring to FIG. 10, a method (or process) 450 is shown. The method 450 may enhance a region of interest cropped from a panoramic video. The method 450 generally comprises a step (or state) 452, a step (or state) 454, a step (or state) 456, a decision step (or state) 458, a step (or state) 460, a step (or state) 462, and a step (or state) 464.

The step 452 may start the method 450. In the state 454, the crop/zoom module 146 may generate the cropped region of interest image (e.g., the region of interest video frame). For example, the crop/zoom module 146 may receive the signal PANVID and the region of interest coordinates ROI and crop the region of interest 212 from the panoramic video. Next, in the state 456, the crop/zoom module 146 may perform a digital zoom of the cropped image. Next, the method 450 may move to the decision state 458.

In the decision state 458, the encoding module 158 may determine whether the resolution of the cropped and zoomed image can be increased within the size constraints of the cropped region. If the resolution can be increased, the method 450 may move to the state 460. In the state 460, the encoding module 148 may use over-sampling of the camera sensor 130 to generate a higher resolution image (e.g., a higher resolution version of the cropped region). Next, the method 450 may move to the state 462.

In the decision state 458, if the resolution cannot be increased, the method 450 may move to the state 462. In the state 462, the encoding module 148 may present the enhanced image (e.g., the enhanced region of interest video frame 250) to the communication device 102. Next, the method 450 may move to the state 464. The state 464 may end the method 450.

The use of analytics may be performed by the apparatus 100 onboard the drone 52 (e.g., while in-flight). Actively controlling the region of interest 212 by performing the analytics may provide a possibility of an improved real time response time for the tracking of particular subjects (e.g., objects). For example, actively controlling the region of interest 212 may avoid a delay time associated with transmitting the image wirelessly to the pilot 70, in addition to the response time of the pilot 70 and the delay time of either physically moving the camera 58 (e.g., by implementing a mechanical system) and/or manually adjusting the region of interest 212 (e.g., for a 360-degree camera).

The functions and structures illustrated in the diagrams of FIGS. 1 to 10 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   an interface configured to (i) receive a panoramic video stream from a capture device and (ii) present one or more enhanced region of interest video frames to a communication device; and
   a processor configured to (i) perform de-warping operations on said panoramic video stream received from said interface, (ii) perform video analytics on said de-warped panoramic video stream to select a region of interest, (iii) crop said de-warped panoramic video based on said region of interest to generate a region of interest video frame, (iv) enhance said region of interest video frame and (v) present said enhanced region of interest video frame to said interface, wherein (a) said de-warping operations are implemented to correct distortion caused by said capture device and (b) said region of interest is dynamically selected based on objects detected in response to said video analytics.

2. The apparatus according to claim 1, wherein said capture device comprises a wide angle lens configured to capture a wide field of view without physically moving said capture device.

3. The apparatus according to claim 1, wherein said processor further comprises a hardware de-warp engine configured to perform said de-warping operations.

4. The apparatus according to claim 1, wherein said de-warped panoramic video stream is stored in a memory.

5. The apparatus according to claim 1, wherein said objects detected by said video analytics comprise people.

6. The apparatus according to claim 1, wherein said video analytics is configured to (i) detect said objects and (ii) follow said detected objects from frame to frame of said de-warped panoramic video stream.

7. The apparatus according to claim 1, wherein said enhanced region of interest video frame is smaller than a frame of said de-warped panoramic video stream.

8. The apparatus according to claim 1, wherein (i) said apparatus is a component of an unmanned aerial vehicle and (ii) said region of interest is dynamically selected based on movements of said unmanned aerial vehicle.

9. The apparatus according to claim 1, wherein enhancing said region of interest comprises at least one of (i) performing a digital zoom of said region of interest video frame and (ii) over-sampling an image sensor of said capture device to generate a higher resolution image within size constraints of said region of interest video frame.

10. The apparatus according to claim 1, wherein transmitting said enhanced region of interest video frame uses less bandwidth compared to transmitting said panoramic video stream.

11. The apparatus according to claim 1, wherein (i) said apparatus is implemented as a component of an unmanned aerial vehicle and (ii) said communication device is configured to communicate wirelessly.

12. The apparatus according to claim 1, wherein said apparatus is configured to reduce bandwidth for video streaming using de-warping and said video analytics.

13. An apparatus comprising:
an interface configured to (i) receive plurality of portions of a panoramic video stream from a plurality of capture devices and (ii) present one or more enhanced region of interest video frames to a communication device; and
a processor configured to (i) perform video stitching operations on each of said plurality of portions of said panoramic video stream received from said interface to generate a stitched video, (ii) perform de-warping operations on said stitched video to generate a de-warped panoramic video stream, (iii) perform video analytics on said de-warped panoramic video stream to select a region of interest, (iv) crop said de-warped panoramic video based on said region of interest to generate a region of interest video frame, (v) enhance said region of interest video frame and (vi) present said enhanced region of interest video frame to said interface, wherein (a) said de-warping operations are implemented to correct distortion caused by said capture devices and (b) said region of interest is dynamically selected based on objects detected in response to said video analytics.

14. The apparatus according to claim 13, wherein each of said plurality of capture devices is configured to capture one of said portions of said panoramic video stream.

15. The apparatus according to claim 13, wherein each of said plurality of capture devices comprises a lens and a sensor.

* * * * *